United States Patent [19]

Acton et al.

[11] Patent Number: 5,544,319
[45] Date of Patent: Aug. 6, 1996

[54] FIBER OPTIC MEMORY COUPLING SYSTEM WITH CONVERTER TRANSMITTING AND RECEIVING BUS DATA IN PARALLEL FASHION AND DIAGNOSTIC DATA IN SERIAL FASHION

[75] Inventors: John D. Acton, Plantation; Lawrence C. Grant, Coral Spring; Jack M. Hardy, Jr., Plantation; Steven P. Kent, Sunrise; Steven E. Schelong, Plantation, all of Fla.

[73] Assignee: Encore Computer U.S., Inc., Fort Lauderdale, Fla.

[21] Appl. No.: 320,767

[22] Filed: Oct. 11, 1994

Related U.S. Application Data

[63] Continuation of Ser. No. 857,578, Mar. 25, 1992, abandoned.

[51] Int. Cl.$^6$ .......................... G06F 13/00; G06F 13/12; G06F 13/40
[52] U.S. Cl. .................. 395/200.07; 395/200.08; 395/200.2; 364/DIG. 1; 364/240.6; 364/DIG. 2; 364/926.5; 364/931.46; 364/927.95; 364/927.96
[58] Field of Search .................. 395/200.08, 200.07, 395/200.2; 364/240.6, 926.5, 931.46, 927.95, 927.96

[56] References Cited

U.S. PATENT DOCUMENTS

| | | | |
|---|---|---|---|
| 4,342,083 | 7/1982 | Freedman et al. | 395/200 |
| 4,430,699 | 2/1984 | Segarra et al. | 395/200 |
| 4,675,861 | 6/1987 | Uttermark | 370/4 |
| 4,748,617 | 5/1988 | Drewlo | 370/85 |
| 4,769,771 | 9/1988 | Lippmann et al. | 395/200 |
| 4,811,210 | 3/1989 | McAulay | 395/325 |
| 4,935,894 | 6/1990 | Ternes et al. | 395/325 |
| 4,991,079 | 2/1991 | Dann | 395/200 |
| 5,276,806 | 1/1994 | Sandberg et al. | 395/200 |

OTHER PUBLICATIONS

Vetta et al., "Network Supercomputing", IEEE, 1992 pp. 38–44.
McFarland et al, "MP's Link Interface Chipset for Serial-HIPPI", IEEE 1992, pp. 229–233.
Amitai, Zwie "Address Filtering in FDDI LAN Bridges", Wescon Conference Record, Nov. 1989. pp. 235–239.

Primary Examiner—Thomas C. Lee
Assistant Examiner—D. Dinh
Attorney, Agent, or Firm—Keck, Mahin & Cate

[57] ABSTRACT

A system for coupling sets of plurality of nodes that are memory coupled to pass write only data memory to memory via a data link that further includes an optical fiber controller coupled to each data link. Each controller is interconnected through fiber for high speed data transfers from one set of nodes to another. The controller is capable of connection implementing three and four cable interfaces. The data is transmitted through the fiber serially but the controller is adapted to receive parallel data and convert to serial form and vice versa.

6 Claims, 31 Drawing Sheets

FIBER OPTIC MEMORY COUPLING SYSTEM WITH CONVERTER TRANSMITTING AND RECEIVING BUS DATA IN PARALLEL FASHION AND DIAGNOSTIC DATA IN SERIAL FASHION

This is a continuation application of Ser. No. 07/857,578, filed Mar. 25, 1992, now abandoned.

FIELD OF THE INVENTION

This invention relates to a novel fiber optic memory interconnection for linking special memory busses of processing nodes and has particular application for real time data processing systems operating at large distances.

BACKGROUND OF THE INVENTION

Systems for updating memories in coupled nodes are known from U.S. Pat. No. 4,991,079 the content of which is here incorporated by reference and from U.S. Ser. No. 07/403,779 filed Sep. 8, 1989, now abandoned, which is a continuation of Ser. No. 06/880,222 filed Jun. 30, 1986, now abandoned, the content of which is here incorporated by reference, all of which are commonly owned with the present application. Such systems use two,ported memories and are used to transfer writes to one memory in one node automatically and at high speed to memory in other nodes with the intervention of a CPU. Such systems, however, have a distance limitation of about 120 feet and eight nodes. The present invention is an improvement that enables such systems to be connected over a distance. The present state of the art allows for connections of 3 kilometers and up to ten kilometers with a high speed data interface.

SUMMARY OF THE INVENTION

The present invention provides a means for connecting such memory coupled processing systems over a large distance and provides for high speed data transfers between the systems, copying data from the memory of a node in one system to the memory of a node in another system.

Other and further advantages of the present invention will become readily evident from the following description of a preferred embodiment when taken in conjunction with the appended drawings.

BRIEF DESCRIPTION OF THE DRAWINGS

FIG. 18 illustrates the mode of operation for handling special async data pass through;

DETAILED DESCRIPTION OF THE PREFERRED EMBODIMENT

Figure 1:
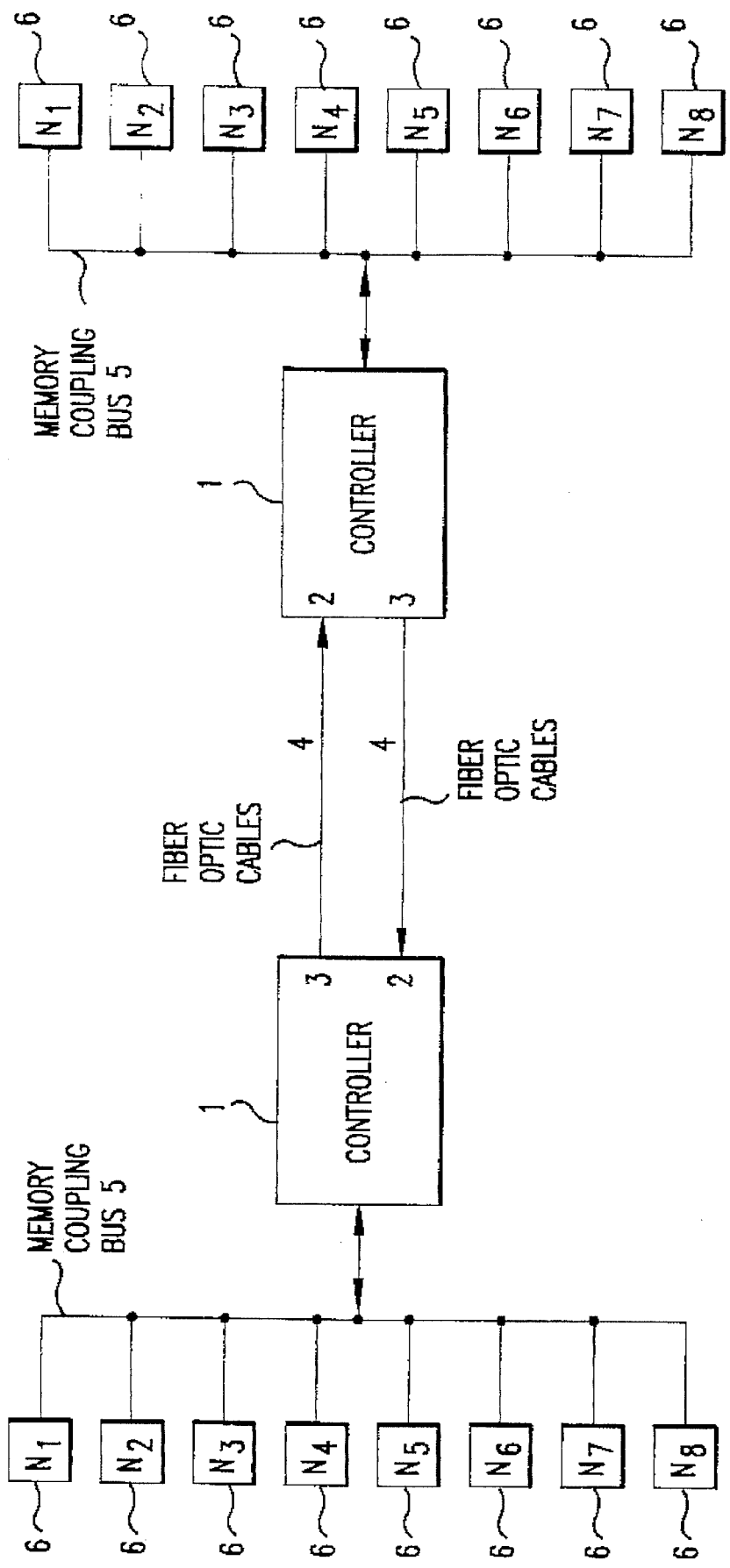
FIG. 1 illustrates the system of the present invention.

This invention relates to a high speed data interface system using fiber optic memory interconnection as shown in FIG. 1. This interface system connects memory coupled systems over distances up to 10 kilometers. Each memory coupled system comprises a data link or memory coupling bus 5 to which up to eight nodes 6 are coupled each comprising a processor, I/O, a two or more ported memory and a processor to memory bus. Write/read sense controllers couple the busses and the memory so writes only are sensed and reflected to the memories of other nodes without CPU intervention. This is described in detail in the patent and application noted above, both of which are here incorporated by reference. The bus 5 of each memory coupled system is connected to a fiber-to-memory coupling system controller (FMC) 1. Each FMC has both an input and output port for connection with another FMC. The input port 2 is for receiving transmitted data from another memory coupled system and the output port 3 is for transmitting data to another memory coupled system. The transmission of the data is through fiber optic cables 4.

The Fiber Optic Memory Coupling System (FOMCS) also provides the capability for nodes on separate MC busses to exchange async serial data across the fiber link and for a node on one MC bus to interrupt a node on another. Each FMC supports 8 general purpose async ports and 16 interrupt lines (8 input and 8 output). The multidrop console link incorporated in the MCS-II fourth cable is also supported.

These features are intended to allow remote booting of nodes across the fiber and to provide a means of synchronizing the actions of nodes.

Throughout this document, the term "MCS cluster" (or simply "cluster") is used to refer to a MC bus and its attached nodes and FMC. In configurations of only two or three clusters, pairs of FMCs are used to directly connect MC busses (see FIG. 28). In a configuration of more than three clusters, a FOMCS hub is used to connect all the clusters in a star configuration (see FIG. 29).

Figure 28:
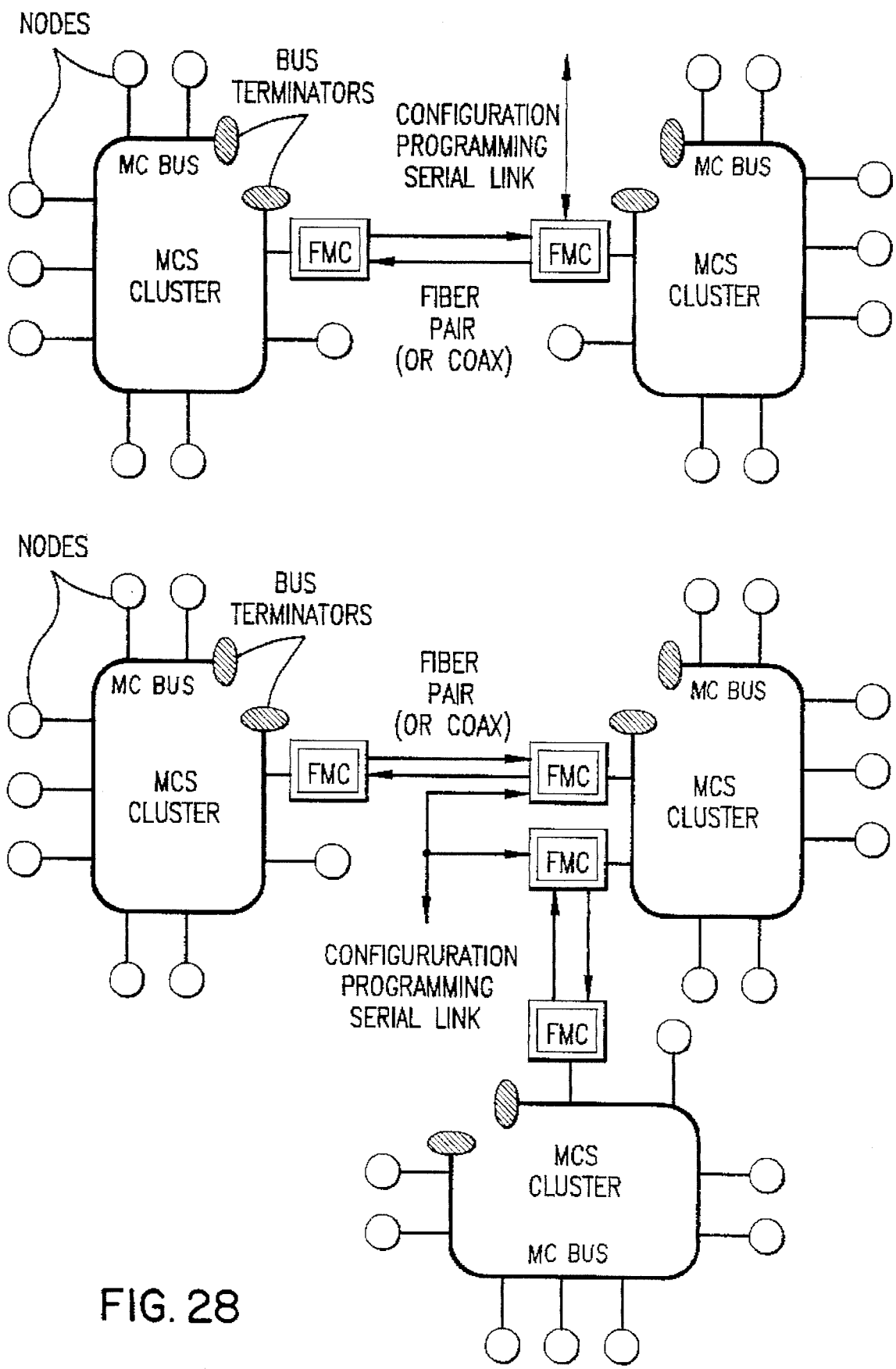
FIG. 28 illustrates typical configurations of the present invention.
Figure 29:
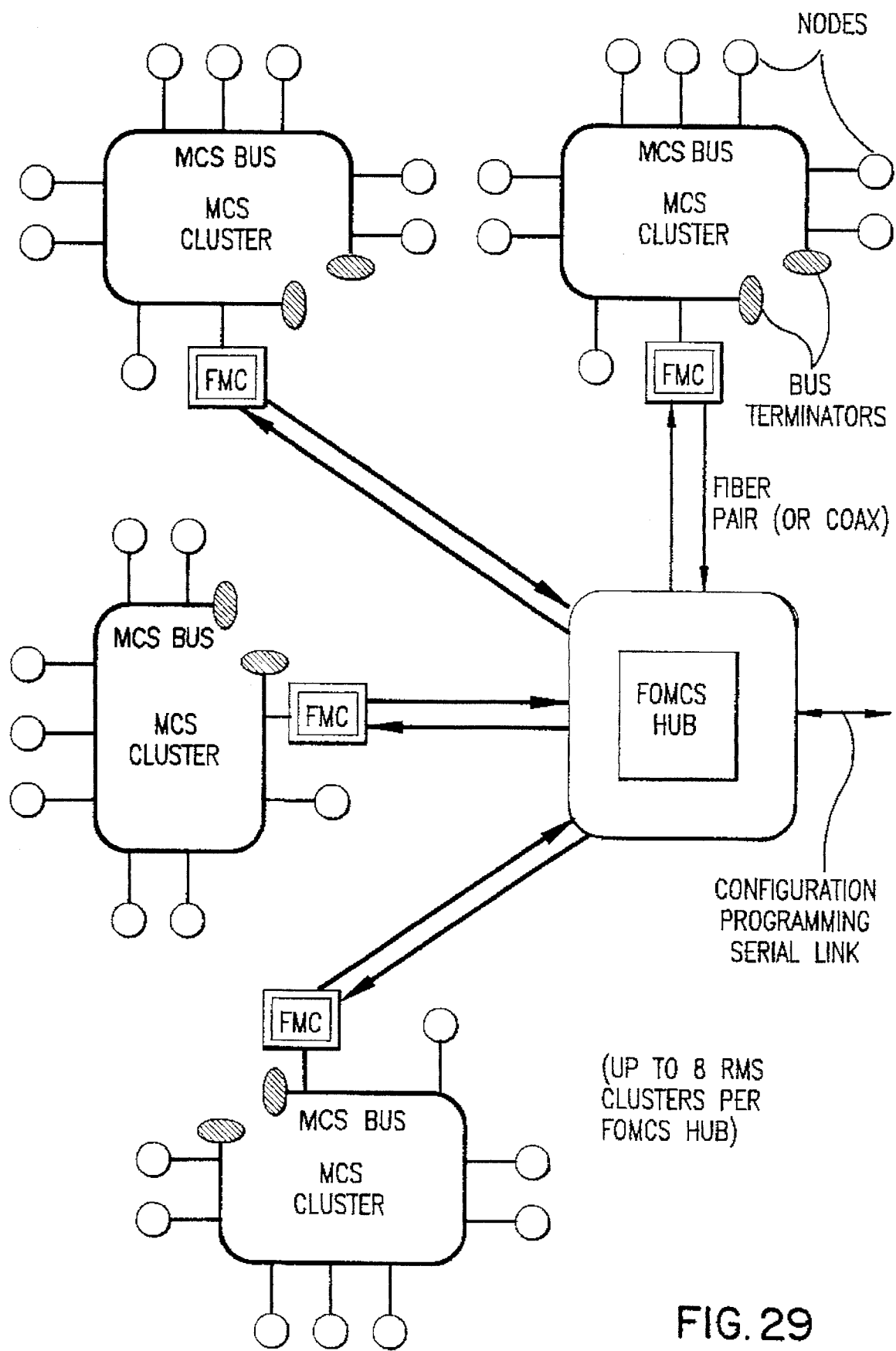
FIG. 29 illustrates a star configuration of the present invention.

The configuration programming link shown in FIGS. 28 and 29 is used to establish the operational mode of each FMC. FMCs which are not directly connected to the programming link receive programming information via packets sent over the fiber link. The FMC 1 can be seen in more detail in FIG. 2. The FMC includes a Receive Data Path 7, an output latch 9, a receive FIFO 11, a receive Error Detection Circuit 13, two receive latches 15 and 17, a receiver 19, an input latch 10, a hit and translation RAM 12, a transmit FIFO 14, a transmit Error Detection Circuit 16, two transmit latches 18 and 20 and a transmitter 22.

Figure 2:
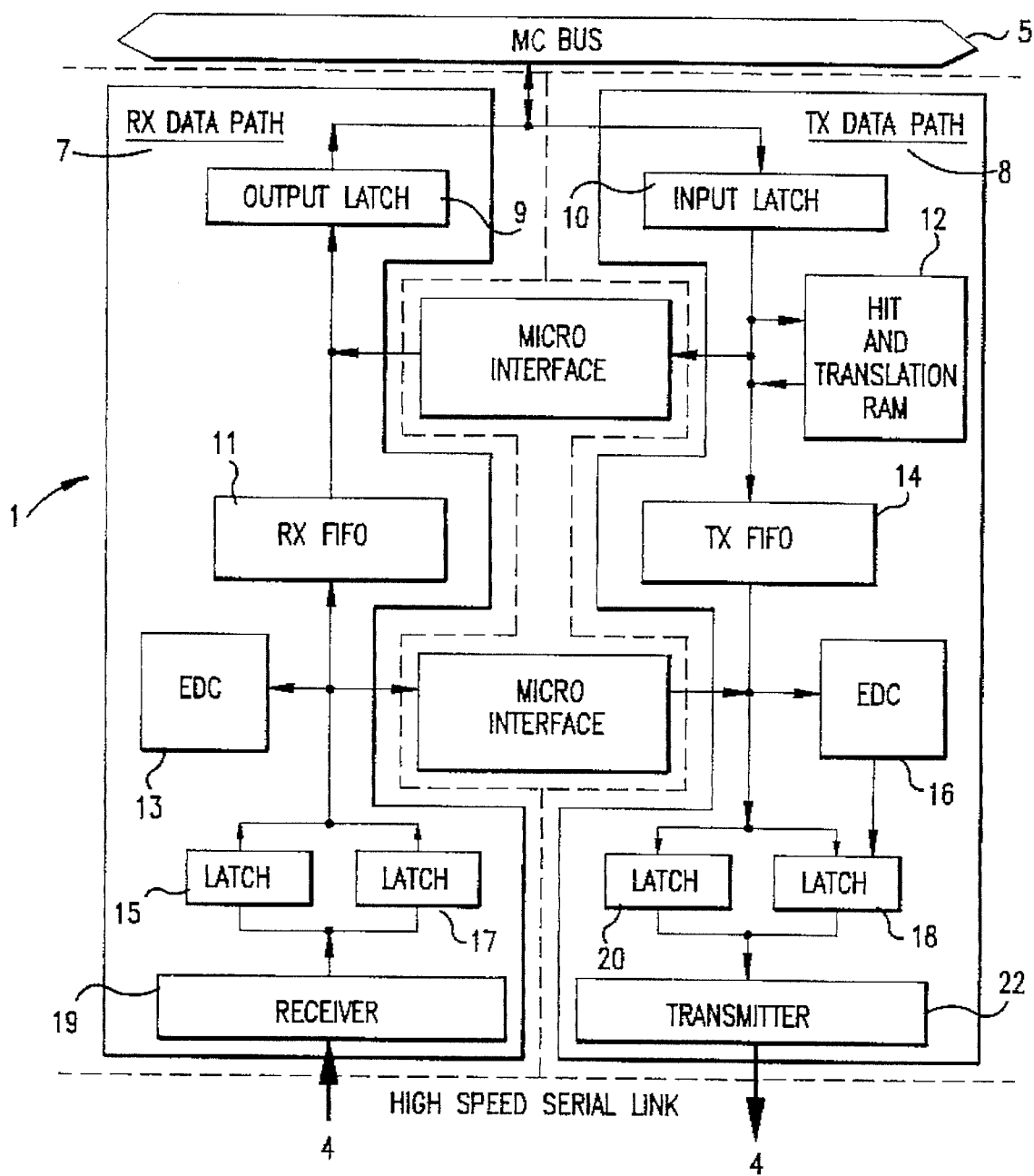
FIG. 2 illustrates the fiber to memory coupled system controller (FMC)

The FMC 1 consists of four main sections: the memory coupled system 5 interface, the data paths (Rx and Tx) 7 and 8, the high speed serial data link interface 4, and the microprocessor. These areas are delineated using dashed lines in the functional block diagram (FIG. 2). The Fiber Transition Module (FTM) connects to the FMC high speed serial link interface. The FTM is a known and conventional piece of hardware and serves to connect the electrical signals to corresponding light signals and vice versa.

The Memory Coupling (MC) bus interface is the FMC's link to the Memory Coupling System (MCS) and the nodes on that bus. The FMC implements a three-cable, 90-signal interface for those MCS networks that use a standard MC bus (24-bit addresses), and a four-cable, 120-signal interface for those MCS networks that use the 28-bit addresses provided in MCS-II. Provision is also made in the four-cable interface for eventual support of 32-bit addresses. The FMC supports all the address lines defined in the four-cable interface; however, in an environment where addresses are a full 32 bits, the FMC will only reflect into and out of the first 256 megabytes of memory.

The FMC appears as a typical MCS node on the bus, using one of the nine bus IDs (0–8) available in MCS or MCS-II. The MCS used by the FMC is set during initialization by the configuration programming link.

Figure 3:
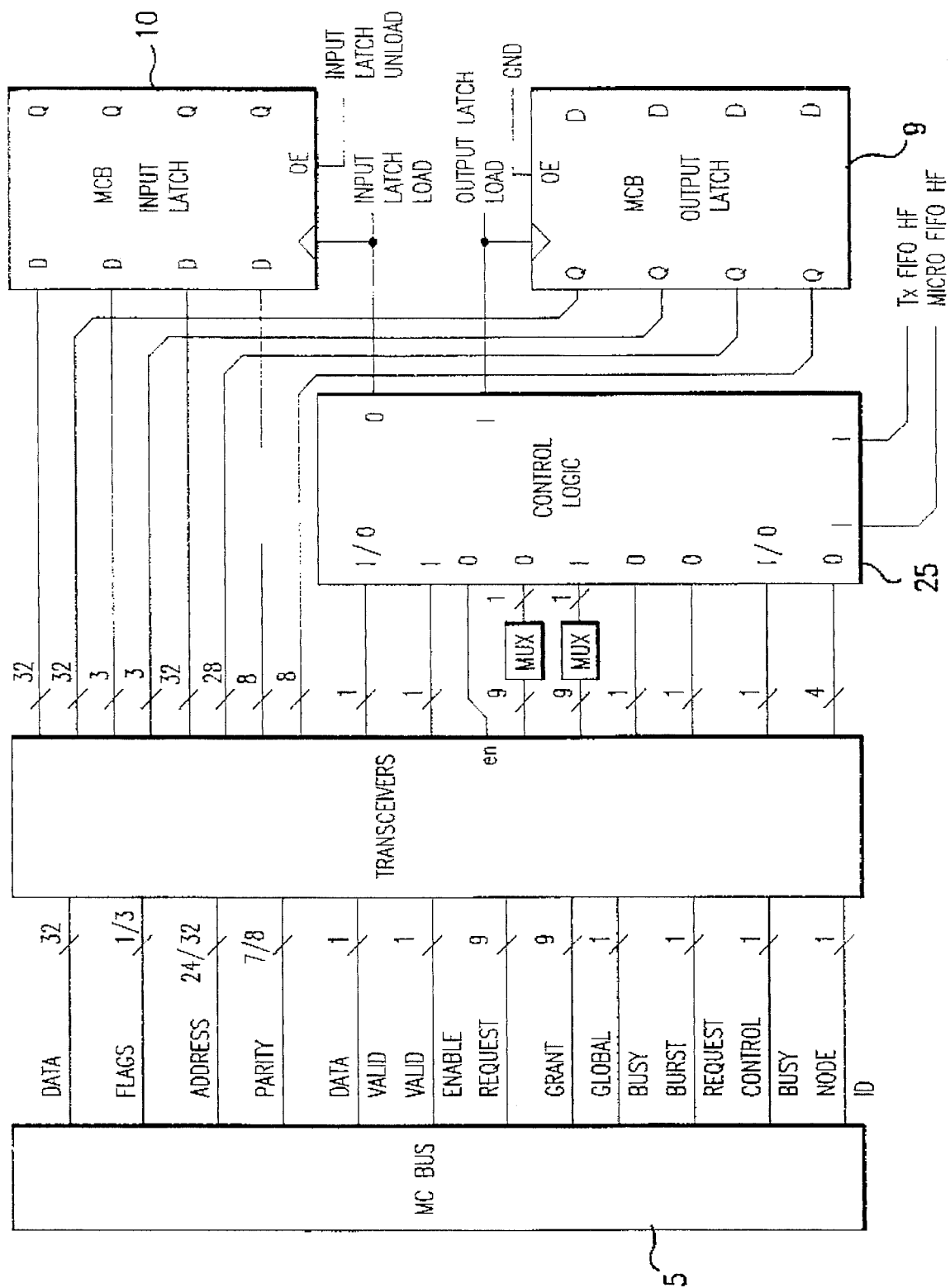
FIG. 3 illustrates the FMC to memory coupling bus interface.

Details of the FMC interface to the MC bus are illustrated in FIG. 3. The FMC MC bus interface receives bus transfers by latching the memory address, memory data, flag bits and parity on the rising edge of DATA VALID (assuming DATA VALID is not being driven by the FMC itself). The two different bit counts for the address, flags and parity lines reflect differences between the three cable MCS bus and the four cable MCS-II bus. The smaller counts apply to the three cable bus. Note that 32 bits of address are indicated for the four cable MCS-II bus rather than 28. As mentioned earlier, signals to support the additional four address bits are reserved in the fourth cable for future expansion. One bit of odd parity is provided for each byte of address and data, resulting in the seven or eight parity bits shown in FIG. 3.

The flag bits qualify the received transfer. For memory write transfers, one flag bit (referred to as the "F-bit") indicates whether the memory write is to a byte location in memory as opposed to a halfword or word. The other two flag bits, which are only present in the MCS-II bus, differentiate between memory write transfers and other types of transfers. While only memory write transfers appear on an MCS-II bus in a cluster, the MCS-II bus in the FOMCS hub is used to distribute interrupt, async and other types of data in addition to memory write traffic.

As indicated in FIG. 3, the address, flags and parity are treated as 32, 3 and 8 bit quantities, respectively, when received by the FMC. If a three cable MCS bus is connected to the FMC, the receivers for the eight most significant address bits, the two extra flag bits and the eighth parity bit are disabled. Zeros are put in the MC input latch for the missing address and flag bits and a one is inserted for the missing parity bit. In a four cable environment, 32 bit addresses are received but the FMC will discard any received memory write transfer in which the most significant four address bits are not zero.

If receipt of a transfer causes the FMC Tx FIFO 14 to become half full, the FMC will drive GLOBAL BUSY on the MC bus to prevent overflow. GLOBAL BUSY is deasserted when the Tx FIFO 14 becomes less than half full. The CONTROL BUSY signal is only present in the MCS-II bus and is only utilized in the FOMCS hub. If receipt of a non-memory-write type transfer causes the FMC FIFO used to hold such transfers to become half full, the FMC will drive CONTROL BUSY to prevent overflow. When the FIFO becomes less than half full, CONTROL BUSY is deasserted.

Before the FMC can generate a transfer on the MC bus, it must first acquire the right to access the bus. To accomplish this, the FMC asserts the REQUEST line on the bus which corresponds to the MCS ID the FMC has been programmed to use. The FMC then monitors the corresponding GRANT line. When the bus arbiter asserts the GRANT line, the FMC drives the memory address, memory data, flag bits and parity on the bus. The FMC's MCS ID is also driven on the node id lines of the bus. On the next rising edge of the VALID ENABLE signal, the FMC drives DATA VALID. (The VALID ENABLE signal is a free running clock generated by the bus arbiter to synchronize the actions of nodes on the bus.)

Note that the MC output latch illustrated in FIG. 3 only supplies 28 bits of the memory address rather than 32. The driver inputs for the remaining four address bits are tied to ground (i.e., the bits are forced to be zeros).

If receipt of a memory write transfer packet causes the FMC Rx FIFO 11 to become half full and MC bus burst request mode is enabled, the FMC will drive BURST REQUEST. Asserting the BURST REQUEST signal, which is only present in the MCS-II bus, causes the bus arbiter to enter a mode in which only the FMC is granted access to the bus. After asserting BURST REQUEST and delaying long enough to guarantee propagation of the signal to the arbiter, the FMC deasserts GLOBAL BUSY. If no other node on the bus is asserting GLOBAL BUSY, the arbiter will begin issuing grants to the FMC. If one or more other nodes is asserting GLOBAL BUSY, the arbiter waits for the busy condition to clear and then begins issuing grants to the FMC. Note that the FMC can safely deassert GLOBAL BUSY even if it is unable to accept more transfers from the bus because the arbiter will only grant bus access to the FMC.

When the FMC has unloaded enough packets front its Rx FIFO 11 to cause the fill level to drop below half full, BURST REQUEST is deasserted and the arbiter returns to the normal "fairness" arbitration scheme. If the FMC is unable to accept more transfers from the bus, it will assert GLOBAL BUSY before deasserting BURST REQUEST.

If the FMC's Tx FIFO is less than half full, the FMC will keep BURST REQUEST asserted for 8 MC bus cycles and then release it for 16 cycles and then assert it for 8, release it for 16 and so on until the Rx FIFO fill level drops below half full. If both the Rx and Tx FIFOs are half or more full, the FMC will assert BURST REQUEST continuously until enough packets have been unloaded from the Rx FIFO to cause the fill level to drop below half full. Once BURST REQUEST is deasserted, the arbiter returns to the normal "fairness" arbitration scheme. If the FMC is unable to accept more transfers from the bus, it will assert GLOBAL BUSY before deasserting BURST REQUEST.

Support for burst request mode in the FMC is enabled or disabled via a configuration programming command. Only one FMC on a given MC bus can have burst request mode enabled but at least one FMC in every FMC-to-FMC link must have the mode enabled to ensure reliable operation. Note that enabling burst request mode in the FMC only means that the FMC is able to drive BURST REQUEST on the bus. For burst request mode to be useful, the four cable MCS-II environment with Memory Coupling Controllers (MCC's) as the bus arbiter/terminators is required. MCC's provide bus termination and arbitration in a conventional manner as known from the previously noted patent and application and are sometimes referred to as reflective memory controllers.

The FMC Rx and Tx data paths 7 and 8 move data between the MCS interface and the high speed serial data link. They also interface to the microprocessor allowing asynchronous data, interrupt transfers and flow control information to move between clusters.

Figure 4:
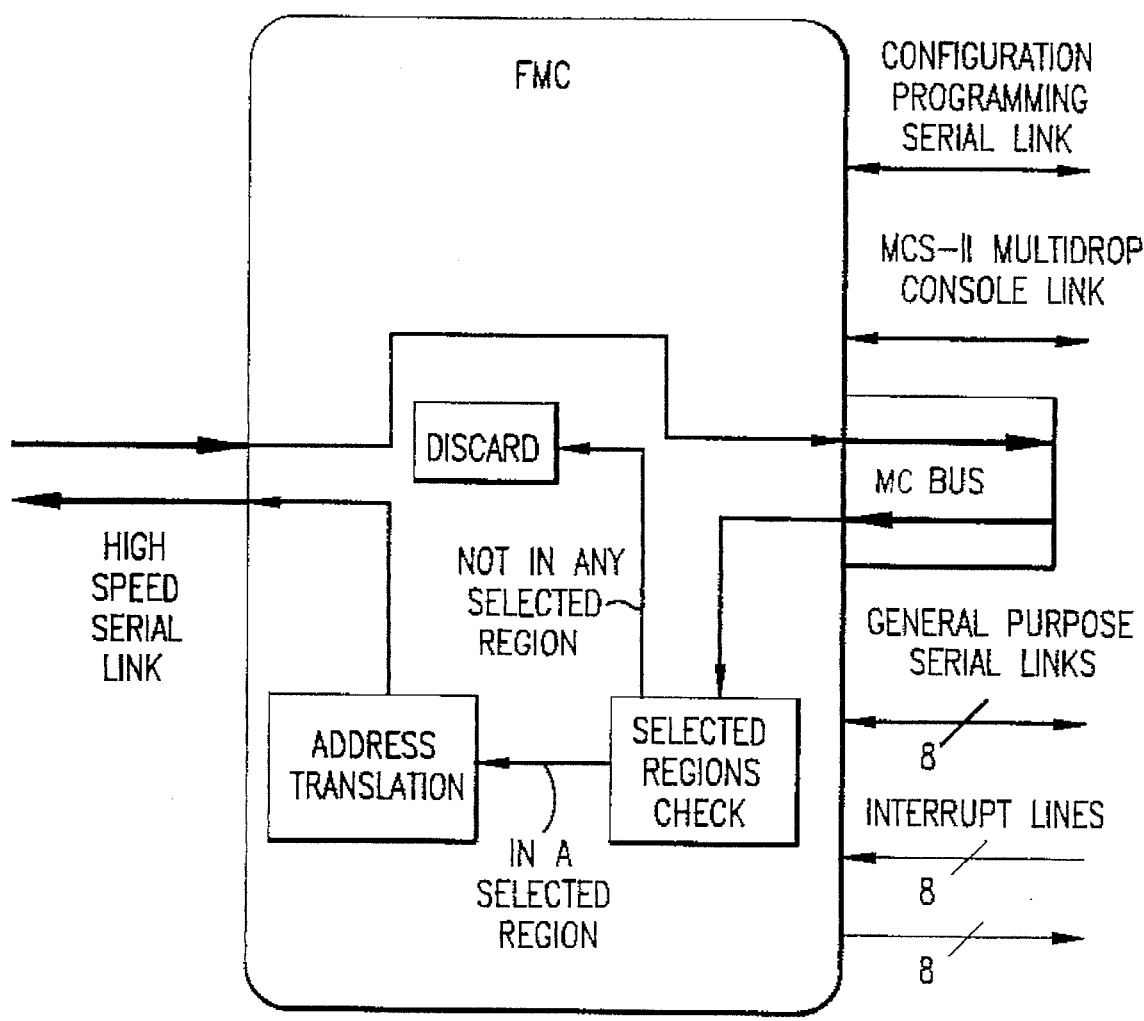
FIG. 4 illustrates the method of handling a memory write transfer by the FMC.

FIG. 4 illustrates the manner in which the FMC processes MCS memory write transfers. As indicated, not all transfers are transmitted as packets over the high speed serial data link. Only those transfers which correspond to memory writes into selected regions of memory are transmitted over the high speed link. Transfers which do not fall within these selected regions are simply discarded.

In the other direction, packets containing memory write transfers are received over the high speed link and decoded by the FMC. Note that in the Rx path 7 there is no hit/translation RAM so all memory write packets received over the high speed link cause memory write transfers to be generated on the MC bus. When a packet has been received which represents a write into memory, the FMC requests the use of the MC bus and when the request is granted, generates a memory write transfer on the bus.

In the Tx path 8, the regions of memory to be reflected are defined during configuration programming of the FMC. During programming, the total memory address space is viewed as a sequence of 8K byte (2K word) blocks. Multiple regions as small as 8K bytes can be defined. Any number of regions, segregated or concatenated, up through the entire address range may be established.

Another feature of the FMC which is illustrated in FIG. 4 is memory address translation. Prior to packetizing a memory write transfer and transmitting it over the high speed link, the memory address is modified. MCS physical addresses are 24 bits long (MCS-I) or 28 bits long (MCS-II). A MCS physical address is translated by using the most significant 11 bits (MCS-I) or 15 bits (MCS-II) to address a hit/translation RAM on the FMC. The value read from the RAM is the most significant 15 bits of the new address.

Figure 5:
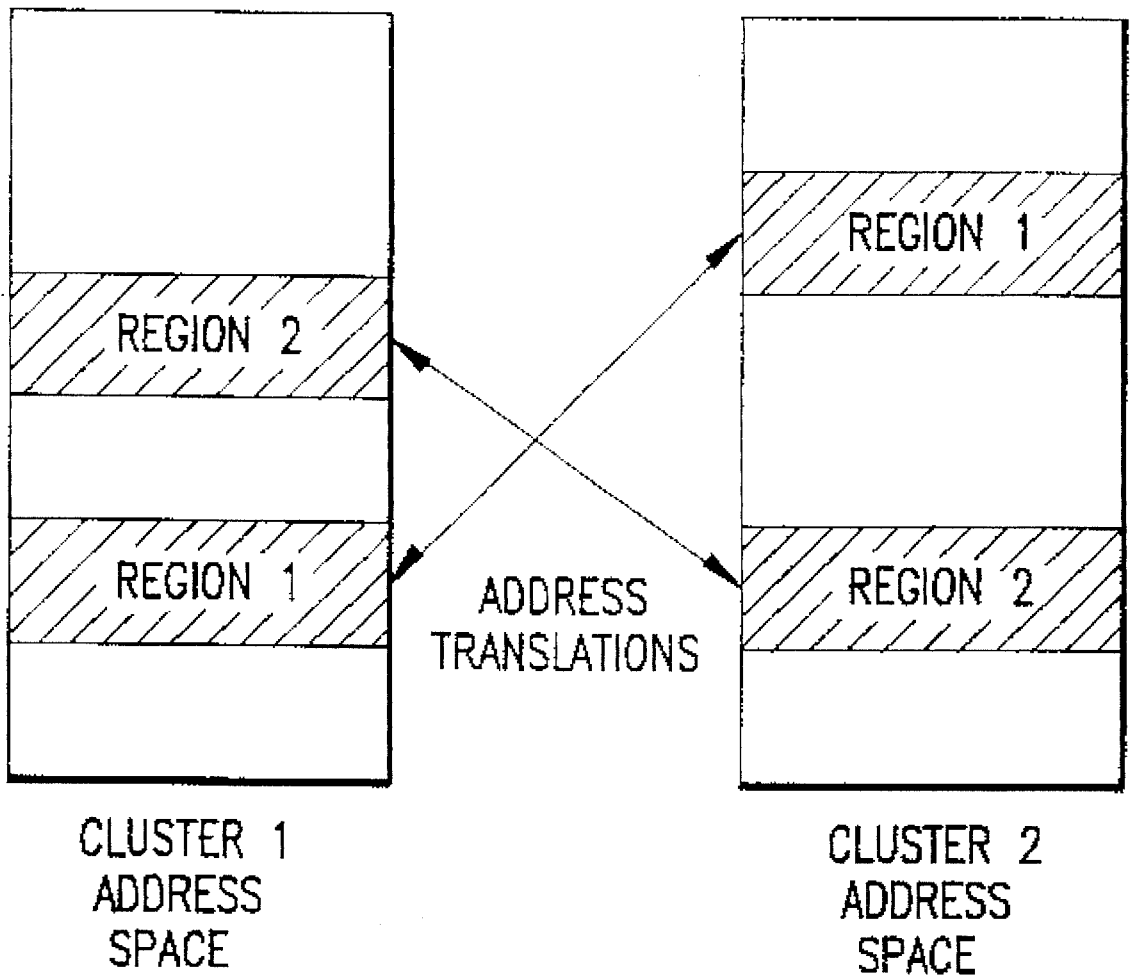
FIG. 5 illustrates an example of address translation as performed by the present invention.

Note that the least significant 13 bits of a memory address are unaffected by the translation process. Thus, 8k byte blocks are mapped from the address space of the source MC bus to that of the destination MC bus and vice verse. As illustrated in FIG. 5, this feature is very useful because it allows clusters to share memory regions which reside in the different places in each cluster's physical address space.

The contents of the hit/translation RAM are established during configuration programming of the FMC. The size of memory addresses (i.e., 24 or 28 bits) on the source MC bus is also established during configuration programming. Each location in the hit/translation RAM represents a 8K byte block of memory and contains a hit bit and the 15 bit translation value. If the hit bit is set, memory writes into the 8K byte memory block are reflected over the high speed link. If the bit is reset, such memory writes are ignored.

In the context of the MCS star network configuration, the FMC region selection and address translation features can be used to segregate the MCS clusters connected to the hub into groups such that memory write traffic is only reflected within a group, not between groups. Note that if an administrative system (i.e., not one of the nodes in the star network) is used to program the FMCs, a secure network can be achieved in which cluster groups can coexist but not affect each others memory. If total isolation of groups is not desired, overlapping regions can be used.

The FMC microprocessor has the ability to interject data into and remove data from both the Tx and Rx data paths 7 and 8. Such data is referred to as control data to distinguish it from memory write transfers. General purpose async data, MCS-II multidrop console async data and interrupt pulses are all treated as control data.

When the FMC receives data over the general purpose async ports, it forms the data into packets and injects those packets into the transmit data stream sent over the high speed link. When a packet of async data is received by the FMC, the bytes are broken out of the packet and sent over the appropriate general purpose async port. MCS-II multidrop console data is handled in a similar fashion.

When an enabled input interrupt line is pulsed, the FMC generates a packet that is sent over the high speed link. Upon receipt of an interrupt packet from the serial data link, the FMC pulses the appropriate output interrupt line.

Other control transfers include configuration programming information, high availability messages, error indications, and reset indications.

Flow control in a MCS network is accomplished by means of flow control bits in the packets sent from FMC to FMC and by means of MC bus busy signals. Internal to the FMC, memory write data transfers and other types of data transfers (i.e., async, interrupt, multidrop, etc.) are handled separately so that flow control may be applied to non-memory write transfers without affecting the memory write traffic. Each packet sent from FMC to FMC contains two flow control bits, one to cause the receiving FMC to cease or resume transmission of memory write transfer packets and another to cause it to cease or resume transmission of other types of packets. This notion of two separate data streams also applies to the hub MC bus where there are separate bus busy signals, one for memory write transfers and another for all other types of transfers.

An additional type of flow control is burst request mode. Burst request mode is necessary to ensure that lock ups do not occur on FMC-to-FMC links. When link utilization is high in both directions, the potential exists for a FMC-to-FMC link to lock up in a condition in which both FMCs are asserting busy on their respective MC busses. Because the busy condition on the MC busses prevents the FMCs from generating bus transfers, the FMCs are unable to reduce the fill levels of their Tx FIFOs 14 and will therefore never deassert bus busy.

Burst request mode alleviates this problem by allowing a FMC to unload transfers from its Rx FIFO 11 while ensuring that the FMC will not have to accept additional transfers into its Tx FIFO 14. This means the FMC can accept more memory write transfer packets from the remote FMC which in turn allows the remote FMC to unload its Tx FIFO 14 and eventually clear the busy condition on the remote MCS bus. Clearing the busy condition allows the remote FMC to unload its Rx FIFO 11. The remote FMC can then accept more memory write transfer packets which allows the local FMC to unload its Tx FIFO 14 and clear the busy condition on the local MC bus.

Figure 6:
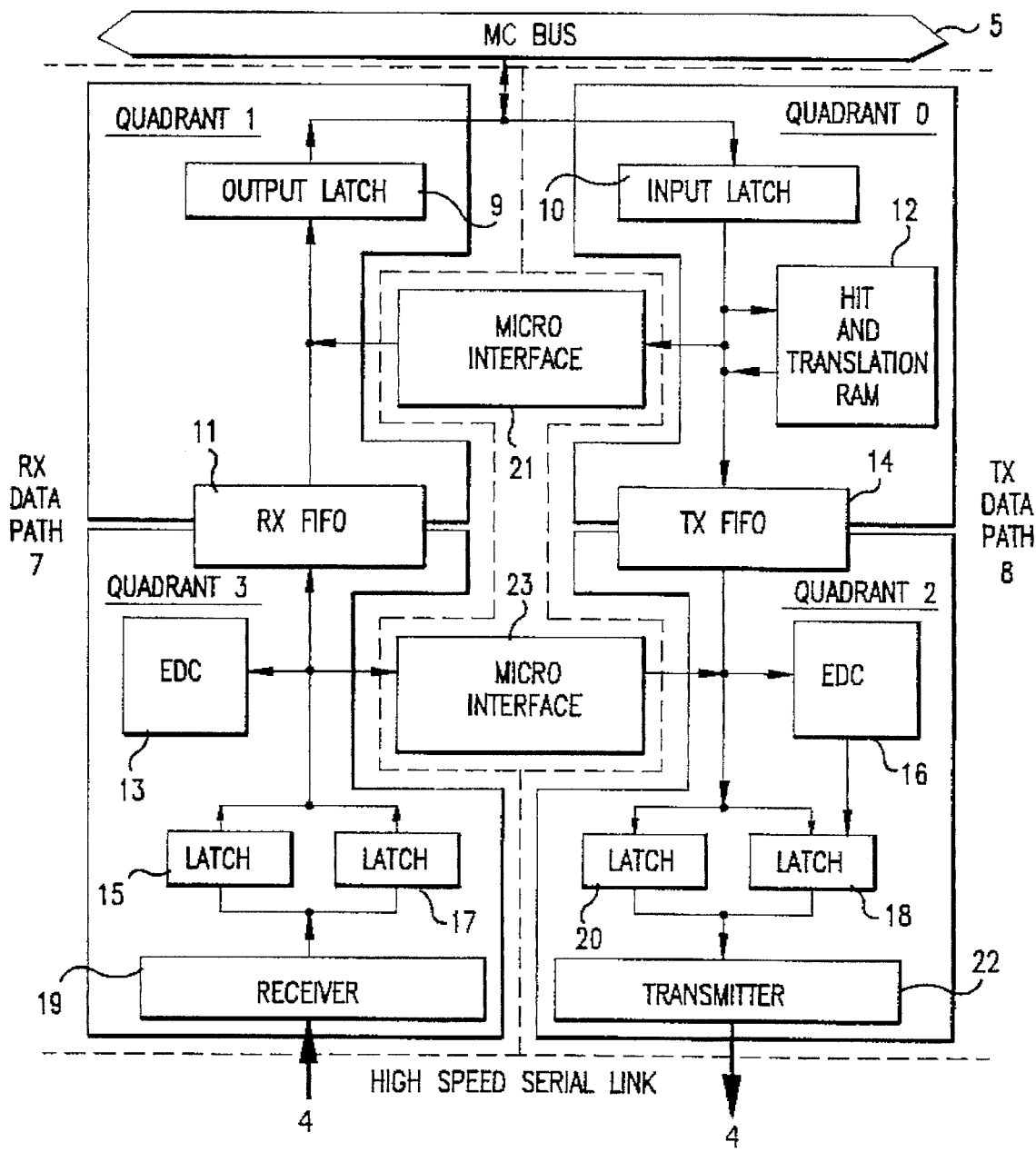
FIG. 6 illustrates the FMC separated into data path quadrants.

As shown in FIG. 6, the FMC data paths are logically subdivided into quadrants. In quadrant 0, MC bus transfers are received and moved to the Tx FIFO 14. The Tx FIFO 14 serves as the boundary between quadrants 0 and 2. In quadrant 2, transfers removed from the Tx FIFO 14 are packetized and transmitted over the high speed serial link 4.

Packets are received over the high speed link 4 in quadrant 3 and the packet contents are moved to the Rx FIFO 11. The Rx FIFO 11 serves as the boundary between quadrants 3 and 1. In quadrant 1, information removed from the Rx FIFO 11 is used to generate transfers on the MC bus.

An important feature of the FMC design, particularly from a diagnostic perspective, is that the latches in each quadrant can be accessed in both a parallel and serial fashion. During normal operation of the FMC, data moves through the latches using the parallel interface. The alternate serial interface allows the microprocessor on the FMC to shift data serially into and out of the latches.

Figure 7:
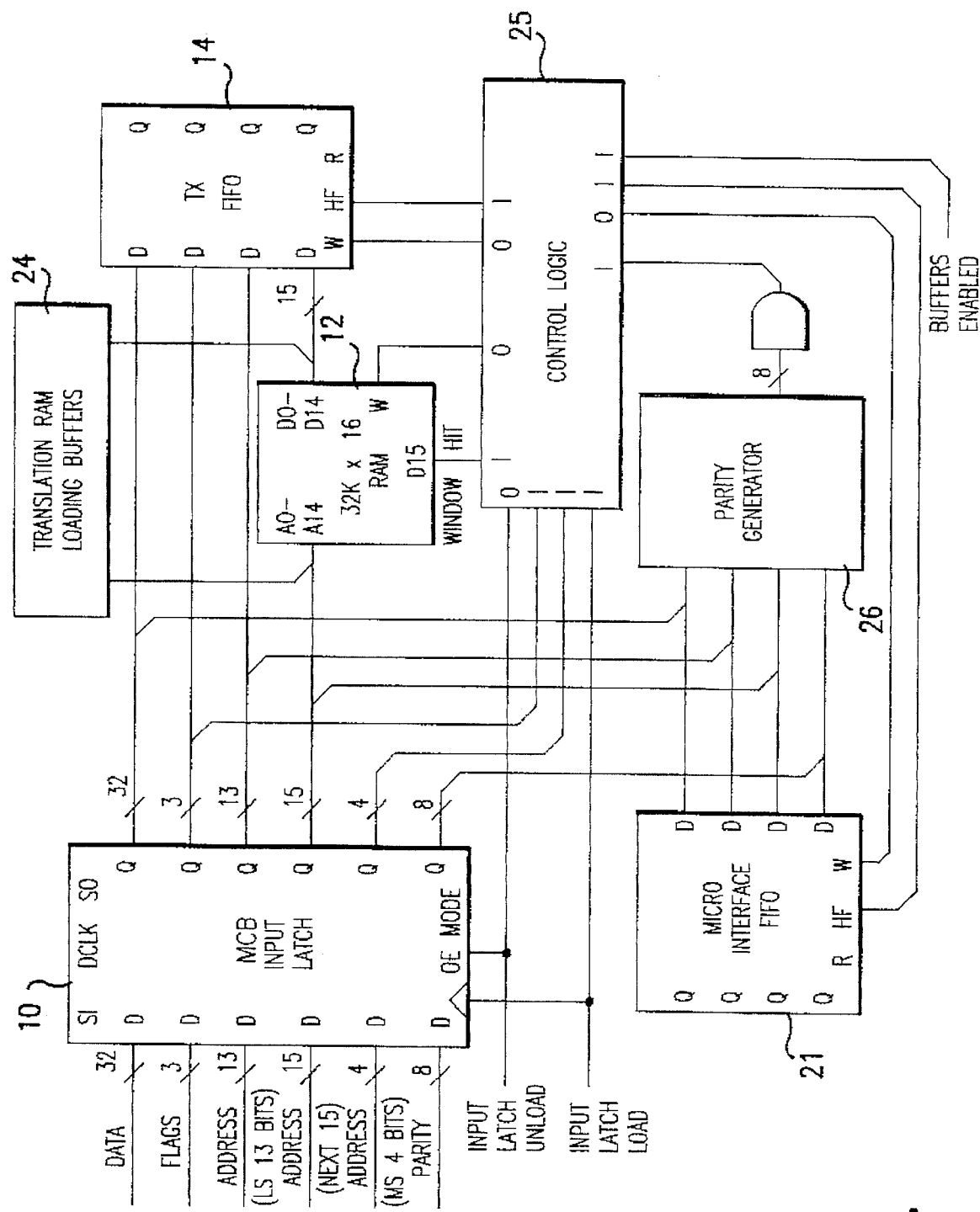
FIG. 7 illustrates Quadrant 0 of the FMC.

FIG. 7 shows a detailed view of quadrant 0. Processing begins in quadrant 0 when the control logic 25 detects that the MC input latch 10 has been loaded. The input latch is unloaded and odd parity is computed on the address and data. The computed parity is then compared to the received parity. At the same time, the most significant address four bits are checked to see if any of them are non-zero.

While the parity and address checks are taking place, 15 bits of the address are used to address the hit/translation RAM 12. (If the address came from a three cable MCS bus, the upper four of the 15 bits used to address the RAM will be zeros.) The least significant 15 bits of the 16 bit value read from the RAM become the new, or translated, address bits. The most significant bit of the value read from RAM is the window hit bit.

The destination of the MC transfer is determined by the parity and address checks, the hit bit, and the flag bits received with the transfer. If any of the most significant four address bits is non-zero, the transfer is discarded. If the received parity does not equal the computed parity, the transfer is clocked into the microprocessor interface FIFO 21. The transfer is also placed into the micro FIFO if the parity is good but the flag bits indicate a control type transfer (which only occurs in the MCS hub). The destination of a memory write type transfer with good parity depends on the setting of the hit bit. If the hit bit is reset, the transfer is simply discarded. If the hit bit is set, the memory data, translated memory address and flag bits are clocked into the Tx FIFO 14.

The contents of the hit/translation RAM 12 are initialized by the FMC microprocessor. To change a location in the RAM 12, the microprocessor first puts the new value into the loading buffers 24. The microprocessor then causes GLOBAL BUSY to be asserted on the MC bus and waits long enough for any transfer in progress to pass through the MC input latch 10. Then, the microprocessor causes the hit/translation RAM 12 to be written with the value from the loading buffers. GLOBAL BUSY is subsequently deasserted.

Figure 8:
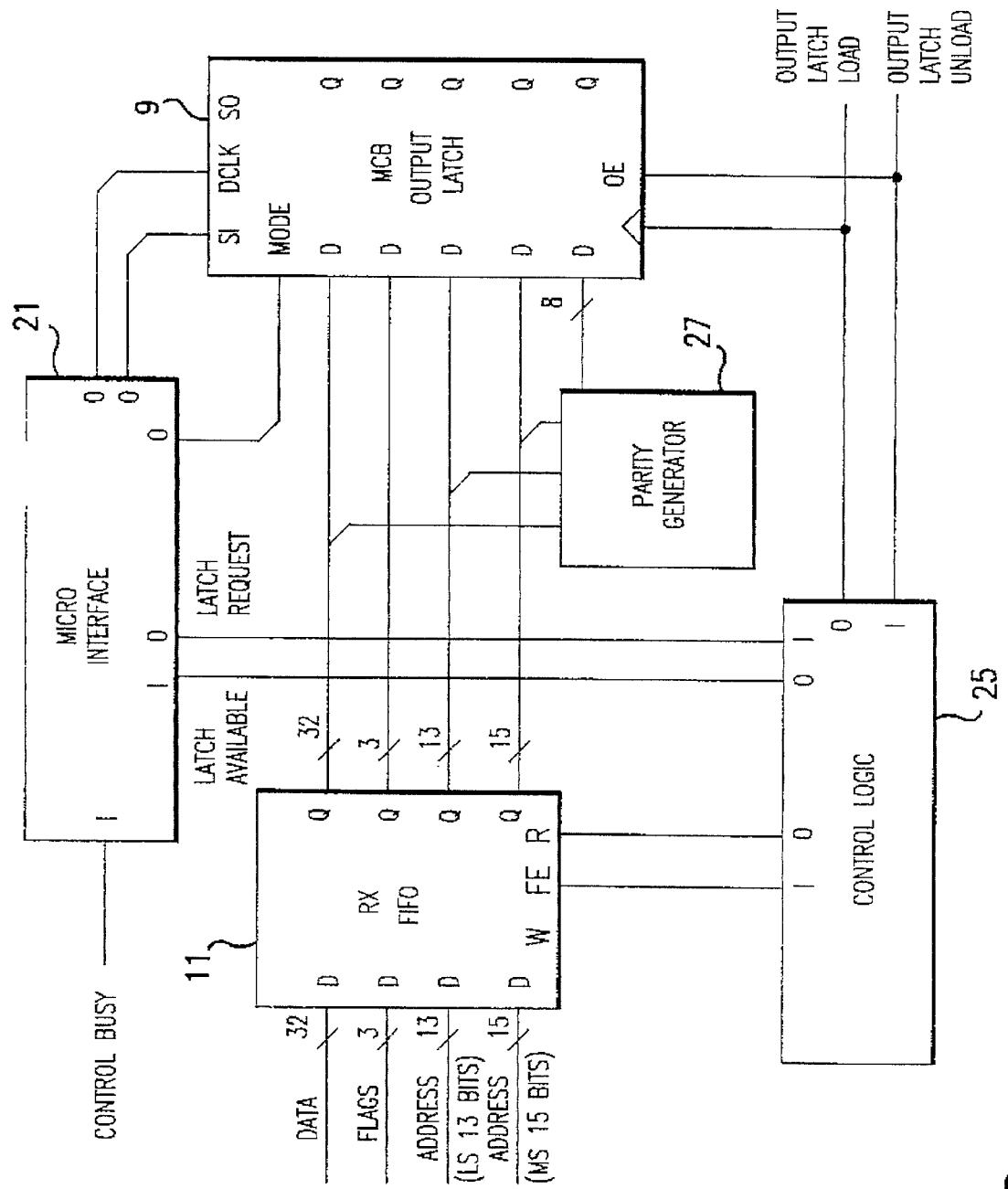
FIG. 8 illustrates Quadrant 1 of the FMC.

FIG. 8 shows a detailed view of quadrant 1. Quadrant 1 processing begins when the control logic 25 detects that the MC output latch 9 is empty and either the Rx FIFO 11 is not empty or the micro interface 21 is requesting use of the latch 9. If there is something in the FIFO 11 and the micro interface 21 is not requesting, the FIFO 11 is read and parity is computed on the memory address and data. The data, address, flags and computed parity are then clocked into the MC output latch.

The micro interface 21 is only used when a FMC in a FOMCS hub needs to distribute interrupt, async of other control information to the other FMCs in the hub. If control busy is not asserted on the hub bus, the micro interface logic 21 requests use of the MC output latch 9. When the latch 9 is available, the control data is serially shifted into the latch 9. Odd parity for the transfer is computed by the microprocessor and shifted into the latch 9 following the data.

Figure 9:
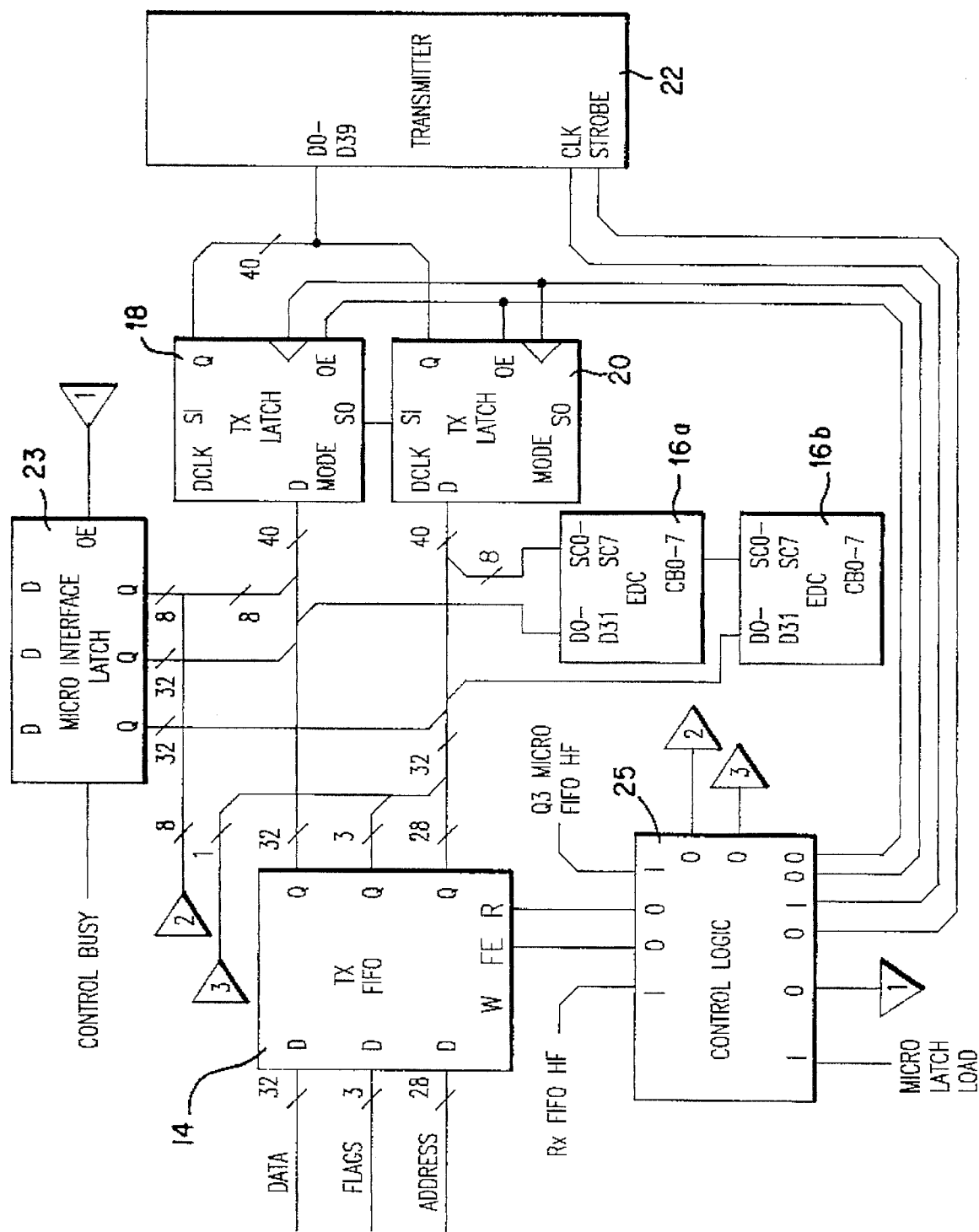
FIG. 9 illustrates Quadrant 2 of the FMC.

FIG. 9 shows a detailed view of quadrant 2. Processing begins in quadrant 2 when the control logic detects that the Tx latches 18 and 20 are empty and finds that the Tx FIFO 14 is not empty or that the microprocessor has loaded the micro interface latch. If the micro latch has been loaded, the contents of the latch are transferred to the Tx latches 18 and 20. Of the 72 bits transferred from the micro latch, 64 are also clocked into a pair of EDC (error detection code) generators 16a and 16b. The generated eight bit EDC and the 72 bits from the micro latch are clocked into the Tx latches 18 and 20. The contents of the Tx latches 18 and 20 are then passed to the high speed link serial transmitter 22 in two 40 bit transfers.

If the micro latch is empty but the Tx FIFO 14 is not, the memory data, address and flags are read from the FIFO 14. An additional nine bits are generated by the control logic to make a total of 72. Again, an EDC is generated on 64 of the 72 and an 80 bit packet is clocked into the Tx latches 18 and 20. The contents of the Tx latches 18 and 20 are then passed to the transmitter 22.

If the control logic detects that either the Rx FIFO 11 or the micro FIFO in quadrant 3 are half full, flow control flag bits are asserted in the 80 bit packet clocked into the Tx latches 18 and 20. If no packet is available to clock into the latches, the control logic 25 causes a special flow control packet to be clocked into the Tx latches 18 and 20 for transmission to the remote FMC. Separate flow control bits are defined for the Rx FIFO 11 and the quadrant 3 micro FIFO so that the flow of memory write and non memory write packets can be throttled separately. Once the FIFO(s) become less than half full, a packet is sent to inform the remote FMC that it can resume transmission of one or both types of packets.

Figure 10:
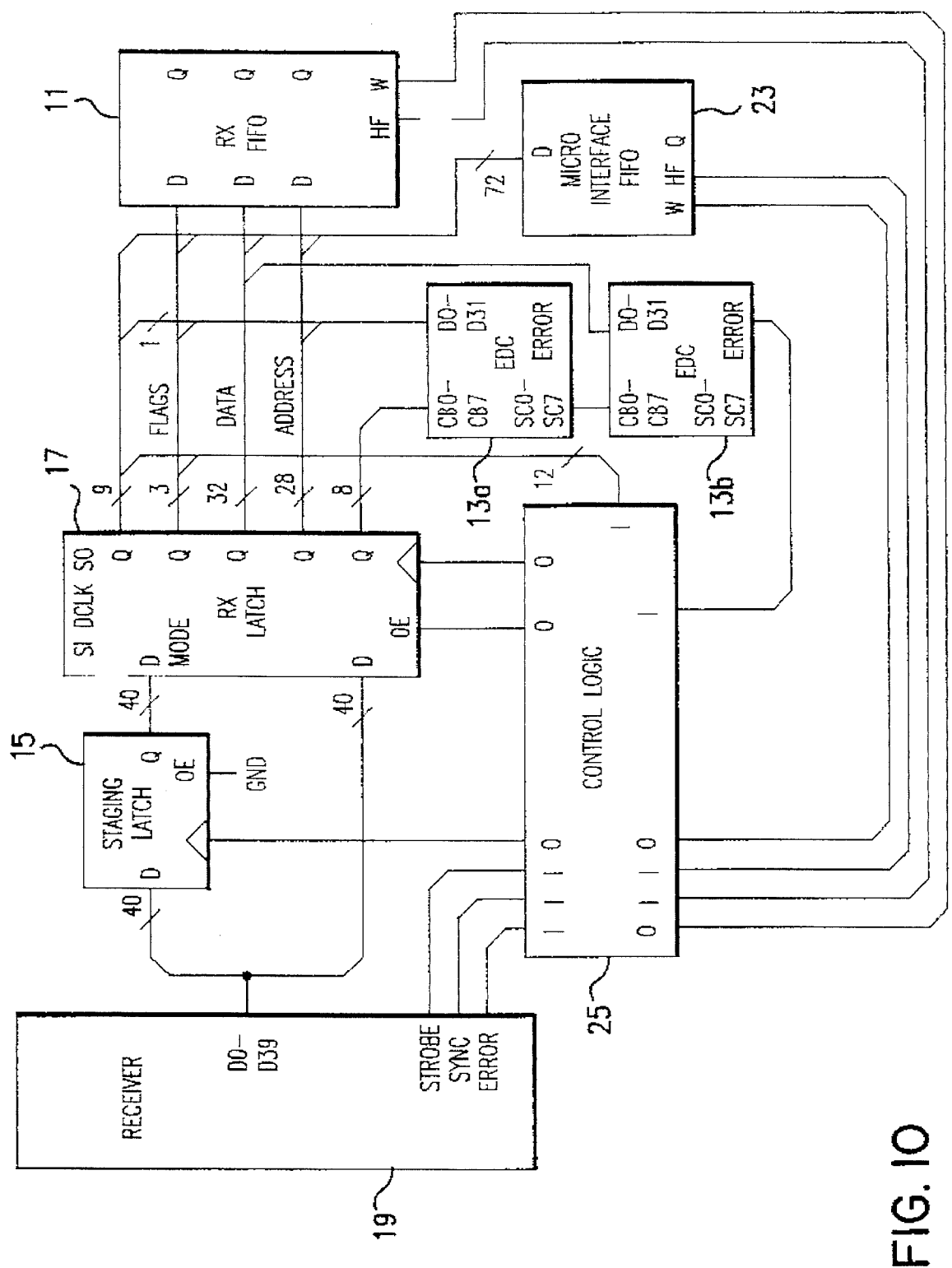
FIG. 10 illustrates Quadrant 3 of the FMC.

FIG. 10 shows a detailed view of quadrant 3. Quadrant 3 processing begins when the first 40 bits of a packet are received over the high speed serial link. Control logic 25 causes the 40 bits to be clocked into a staging latch 15. When the rest of the packet arrives, the entire 80 bit packet is clocked into the Rx latch 17. From the Rx latch 17, 64 bits of the packet are moved to a pair of EDC generators/checkers 13a and 13b. The received EDC is compared to that generated and an indication of the outcome is provided to the control logic.

The destination of the contents of the packet depend on the packet type bits examined by the control logic and the result of the EDC check. If the EDC check fails, the packet contents are moved to the micro interface FIFO 23. The packet contents are also moved to the micro FIFO 23 if the packet type flags indicate that the packet contains async, interrupt or other control information. Otherwise, the memory address, data and flags are moved to the Rx FIFO 11.

Among the 12 packet bits examined by the control logic 25 are the flow control bits, one for throttling memory write packet transmission and the other for throttling non memory write packet transmission. A set flow control bit in a received packet causes the FMC to cease transmission of the corresponding type of packet until a packet is received with that flow control bit reset.

Figure 11:
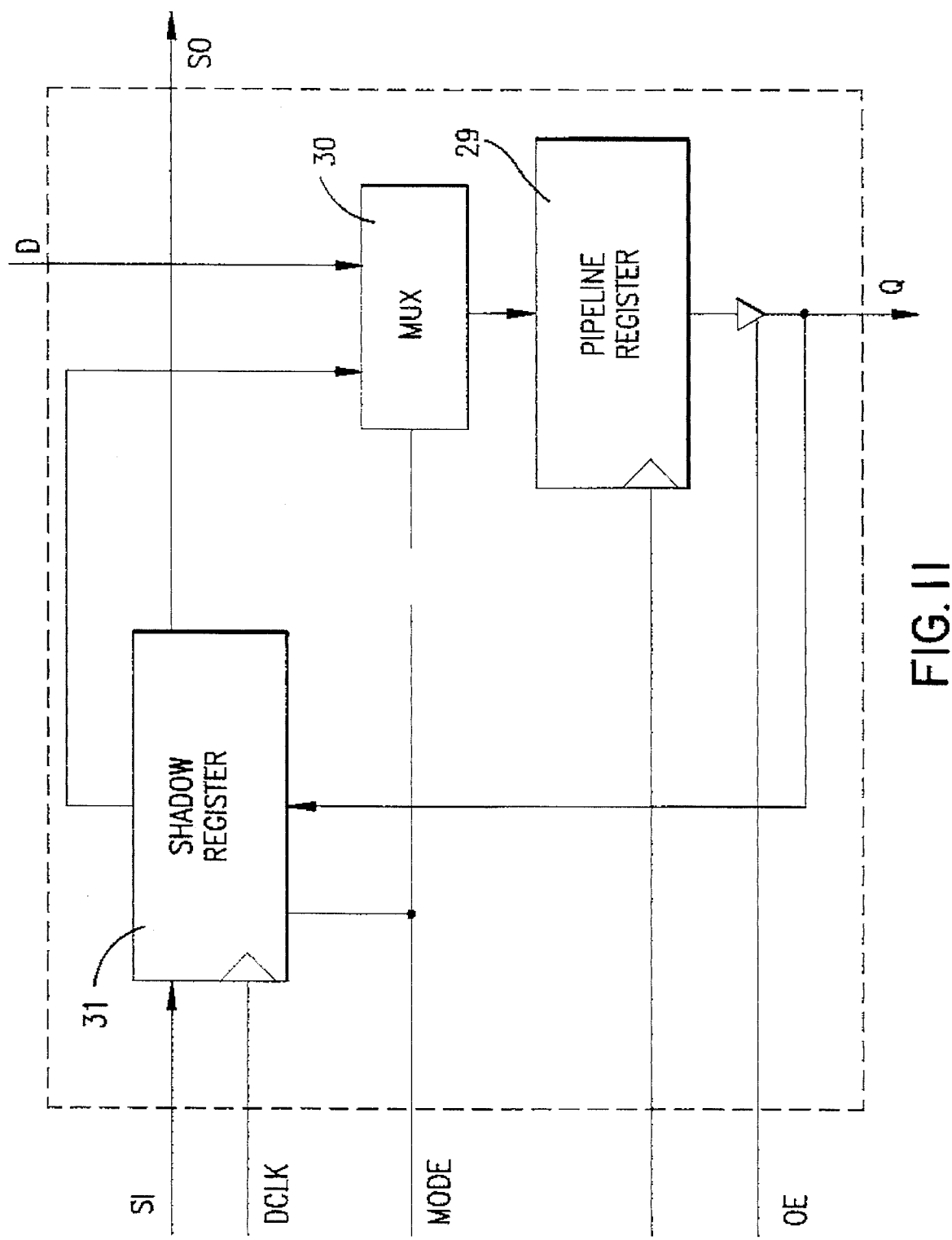
FIG. 11 illustrates a parallel/serial latch used in the present invention.

FIG. 11 shows a block diagram of the AMD 29818 latch used to implement the MC input and output latches 9 and 10 and the Rx latches 15 and 17 and Tx latches 18 and 20 on the FMC. In the FMC design, the normal data path through these latches is the parallel one from the D input through the pipeline register 29 to the Q output. The alternate serial path is accessible by the FMC microprocessor and is primarily used for diagnostic purposes. Note that the mux 30 (which is controlled by the MODE signal) allows either the contents of the shadow register 31 or the D input to serve as the input for the pipeline register 29. Also, note that the output of the pipeline register 29 is feed back into the shadow register 31. Thus, with appropriate hardware control, data can enter the latch in serial and exit in parallel or enter parallel and exit in serial.

These features are exploited by the FMC design which allows the microprocessor to serially load a latch in one quadrant, move the data along the normal parallel path from that latch to a latch in another quadrant and then serially read the contents of the destination latch. By comparing the data loaded into the first latch with that read back from the second, the microprocessor can determine if the data path is functional.

In the FOMCS architecture, the high speed serial link is implemented with a transmit/receive pair of Gazelle Hot Rod chips. The Gazelle Hot Rod transmitter chip converts 40-bit parallel data into serial data that is transmitted over a fiber or coax link. At the remote end of the link, the data is reconverted to the original parallel data by a Hot Rod receiver chip. Over this link, the FMCs exchange information in the form of 80-bit packets. The Gazelle transmitter sends each 80-bit packet as two 40-bit data frames. When no packet is available to send, the transmitter sends sync frames to maintain link synchronization.

The data on the serial data link is 4B/5B NRZI (Non-Return to Zero, Invert on ones) encoded. This allows the receiver to recover both data and clock signals from the data stream, precluding the need for a separate clock signal to be sent along with the data. Data rates as high as 1 Gbps (one billion bits per second) are supported.

Transmission error detection is accomplished via an eight bit error detection code (EDC) which is included in each packet. Of the 72 remaining bits in the packet, only 64 are included in the EDC calculation. The eight unprotected bits are the first four bits of each of the 40-bit halves of the packet.

Figure 12:
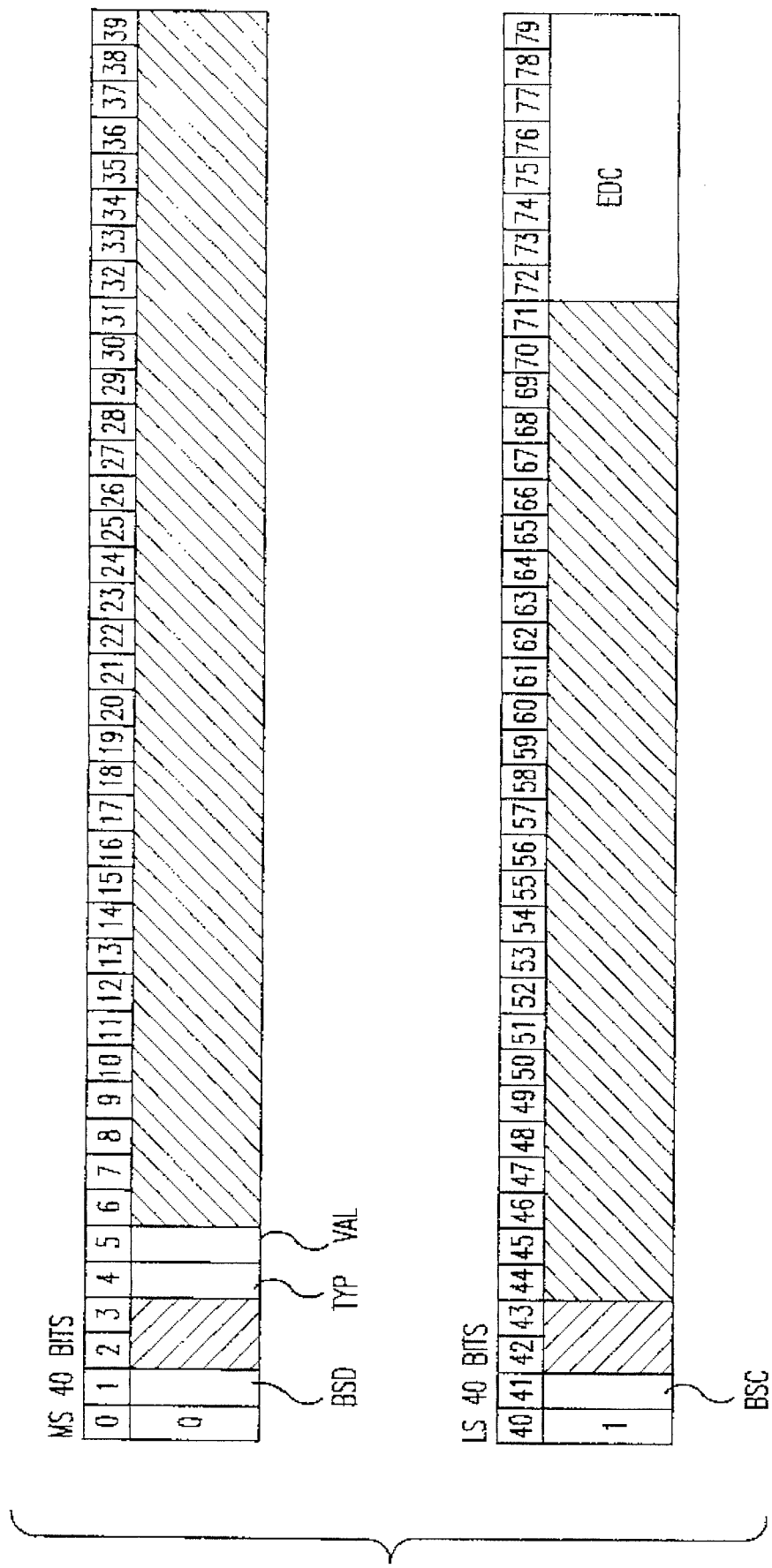
FIG. 12 illustrates the basic packet format.

The basic packet format is shown in FIG. 12.

Bits 0 and 40 are used to distinguish the two 40-bit sections of the packet. When receiving a packet, a FMC always expects the first bit of the first 40-bit section to be a zero and the first bit of the second 40-bit section to be a one.

The BSD and BSC bits (bits 1 and 41, respectively) are used by the transmitting FMC to throttle transmissions by the FMC receiving the packet. The BSD bit is used to tell the receiving FMC to cease or resume transmission of memory write data packets; the BSC bit is used to tell the receiving FMC to cease or resume transmission of control packets. The bits are set to tell the receiving FMC to cease the associated type of transmissions; they are reset to tell the receiving FMC to resume transmissions.

The TYP bit (bit 4) indicates the packet type. If the bit is reset, the packet contains a memory write transfer. If the bit is set, the packet is designated as a control packet. Control packets are used to transfer async data, interrupt data and any other type of information which FMCs must exchange.

The VAL bit (bit 5) indicates whether the cross-hatched portions of the packet (bits 6–39 and 44–71) actually contain any valid information. If the VAL bit is set, the receiving FMC will consider the information in the cross-hatched portions to be valid. If the VAL bit is reset, the receiving FMC will only pay attention to the flow control information encoded in the packet (i.e., the settings of the BSD and BSC bits). When a FMC does not have any data to send, it will periodically transmit packets with the VAL bit reset and the flow control bits set or reset as appropriate.

As mentioned earlier, bits 0–3 and bits 40–43 are not included in the EDC calculation. This means that the BSD bit and/or the BSC bit may be in error in a received packet and no EDC error will be detected. However, even if an invalid flow control indication is received and acted upon, the next packet received will almost certainly correct the problem.

The shaded portions of the packet (bits 2–3 and bits 42–43) are reserved. The convention of shading reserved portions of packets is followed throughout this document.

Bits 72–79 contain the EDC which is computed on bits 4–39 and bits 44–71. The EDC is an 8-bit check byte generated according to a modified Hamming Code which will allow detection of all single- and double-bit errors and some triple-bit errors. Because of the NRZI encoding scheme used by the Gazelle Hot Rod chips, noise on the high speed serial link medium will cause sequential double-bit errors which the receiving FMC will be able to detect by comparing the EDC in the packet to that computed during receipt of the packet.

Figure 13:
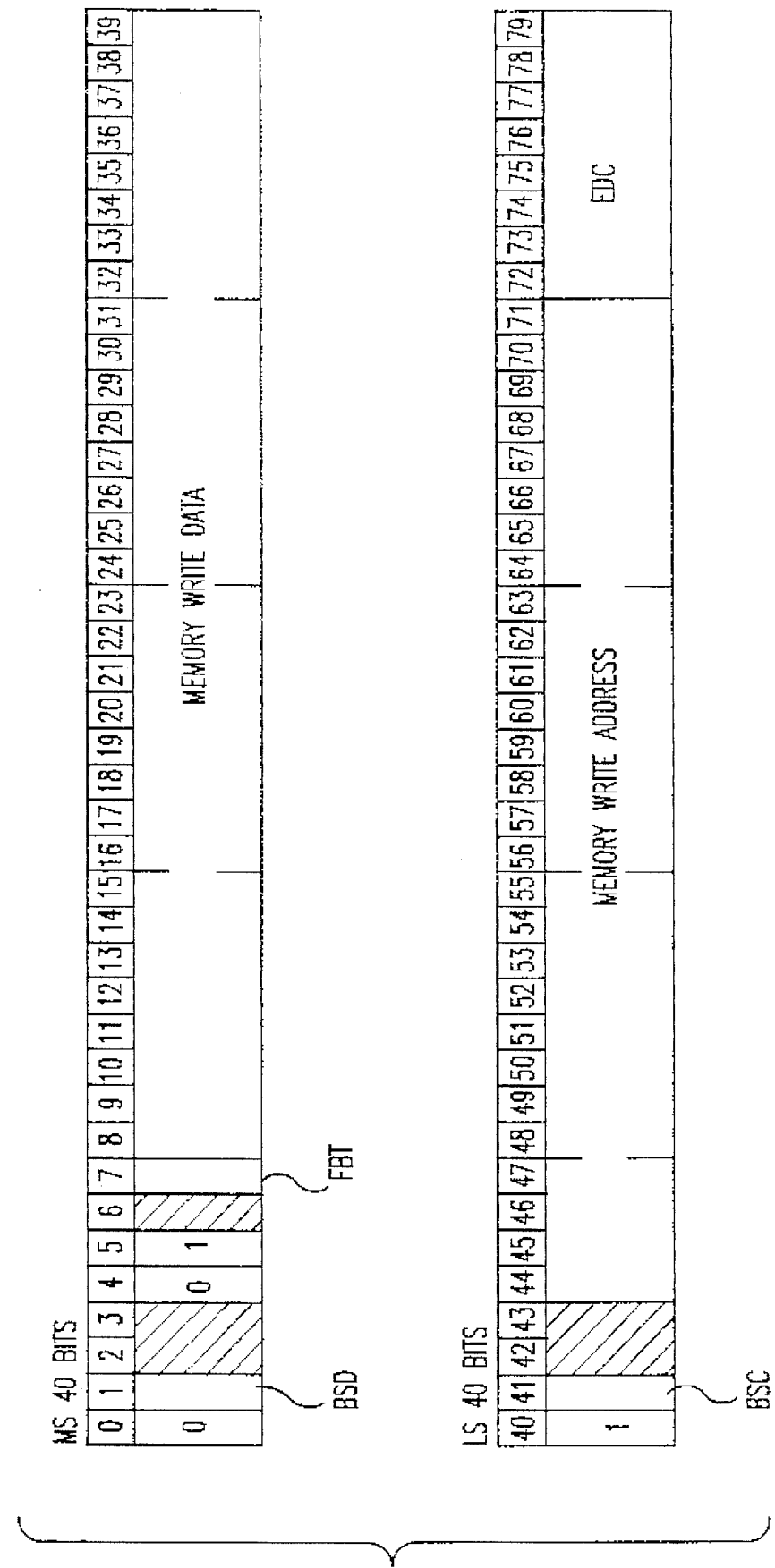
FIG. 13 illustrates the format for a data packet.

The memory write transfer packet is used by the FMC to transmit a memory address and associated data over the high speed link. The address and data represent a memory write transfer which the FMC received from the MC bus. The format of the packet is shown in FIG. 13.

The FBT bit (bit 7) is the F-bit associated with the memory write. The F-bit is set if the memory write transfer represents a write to a single byte of memory. The F-bit is reset if the transfer represents a write to a half-word or word.

Note that if the memory address is a 24-bit address, bits 44–47 of the packet will contain zeros.

Figure 14:
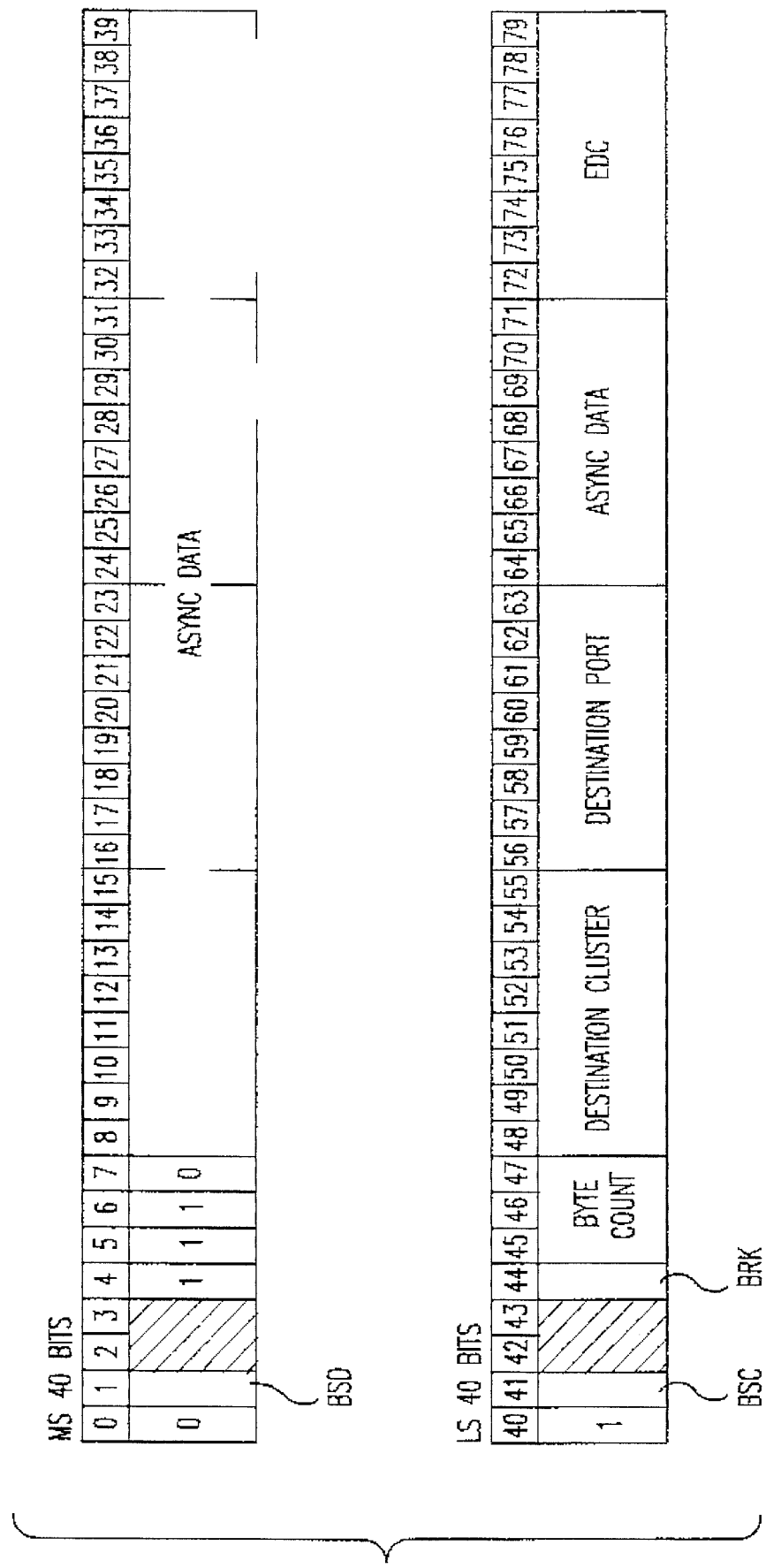
FIG. 14 illustrates the format for a general purpose async data packet.

The general purpose async data packet format is shown in FIG. 14.

The packet can contain up to five bytes of async data. The first four bytes are placed in bits 8–39 with the first byte in bits 8–15, the second in 16–23 and so on. The fifth byte is placed in bits 64–71. The receiving FMC determines the actual number of data bytes in the packet by checking the Byte Count field (bits 45–47).

The Destination Cluster field (bits 48–55) contains the address of the MCS cluster for which the packet is ultimately intended. The FMC in the destination cluster uses the Destination Port field (bits 56–63) to determine which general purpose async port to use when transmitting the async data decoded from the packet.

The BRK bit (bit 44) indicates that the originating FMC received an async break indication. When the BRK bit is set, the packet does not contain any async data (i.e., the Byte Count field contains a zero). Upon receipt of a general purpose async packet with BRK set, the FMC in the destination cluster flushes its output buffer for the destination port and generates a break on that port.

Figure 15:
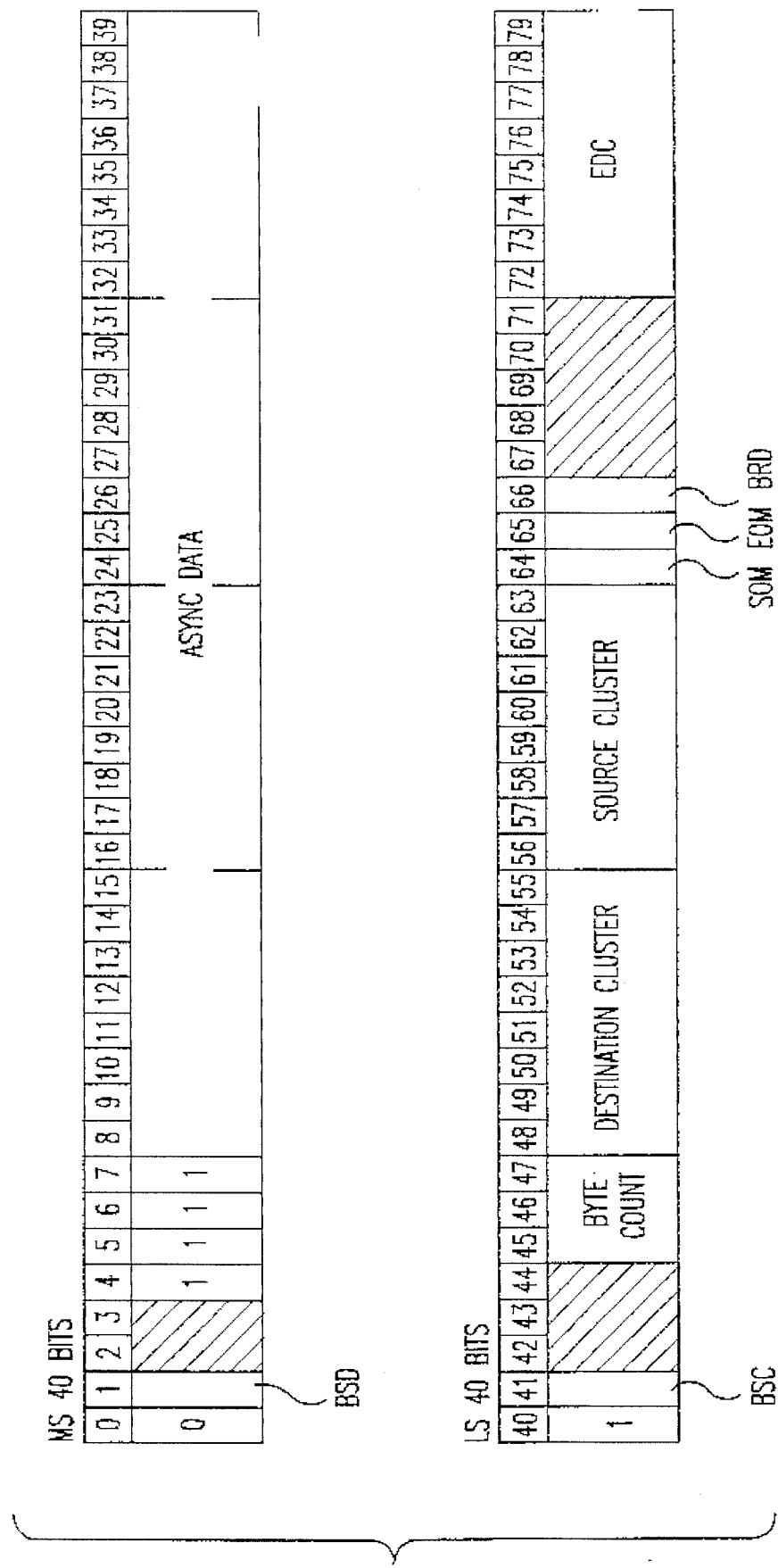
FIG. 15 illustrates the format for a data packet of a MCS-II multidrop console.

The MCS-II multidrop console data packet format is illustrated in FIG. 15.

The packet can contain up to four bytes of async data. The four bytes are placed in bits 8–39 with the first byte in bits 8–15, the second in 16–23 and so on. The receiving FMC determines the actual number of data bytes in the packet by checking the Byte Count field (bits 45–47).

The Destination Cluster field (bits 48–55) contains the address of the MCS cluster for which the packet is ultimately intended. The contents of this field are only meaningful if the BRD bit is reset.

The Source Cluster field (bits 56–63) contains the address of the cluster in which the originating FMC resides. Because multiple packets are required to send a multidrop message, a FMC in a cluster may be receiving parts of messages from two or more clusters at the same time. The source cluster field in the packets allows the receiving FMC to segregate message pieces based on source cluster and thus properly reconstruct the messages.

The SOM bit (bit 64) indicates whether the async data in the packet represents the start of a multidrop message or not. If the SOM bit is set, the packet contains the first 1–4 bytes (depending on the Byte Count) of a multidrop message. If the SOM bit is reset, the packet contains data from within the body of a message.

The EOM bit (bit 65) indicates whether the async data in the packet represents the end of a multidrop message or not. If the EOM bit is set, the packet contains the last 1–4 bytes (depending on the Byte Count) of a multidrop message. If the EOM bit is reset, at least one more packet of data from the message will follow.

The BRD bit (bit 67) is set if the packet is to be broadcast throughout the FOMCS network to all clusters. If the BRD bit is set, all FMCs in a FOMCS hub will forward the packet to their respective remote clusters. All cluster FMCs receiving such a packet will accept it (assuming they have multidrop support enabled).

Figure 16:
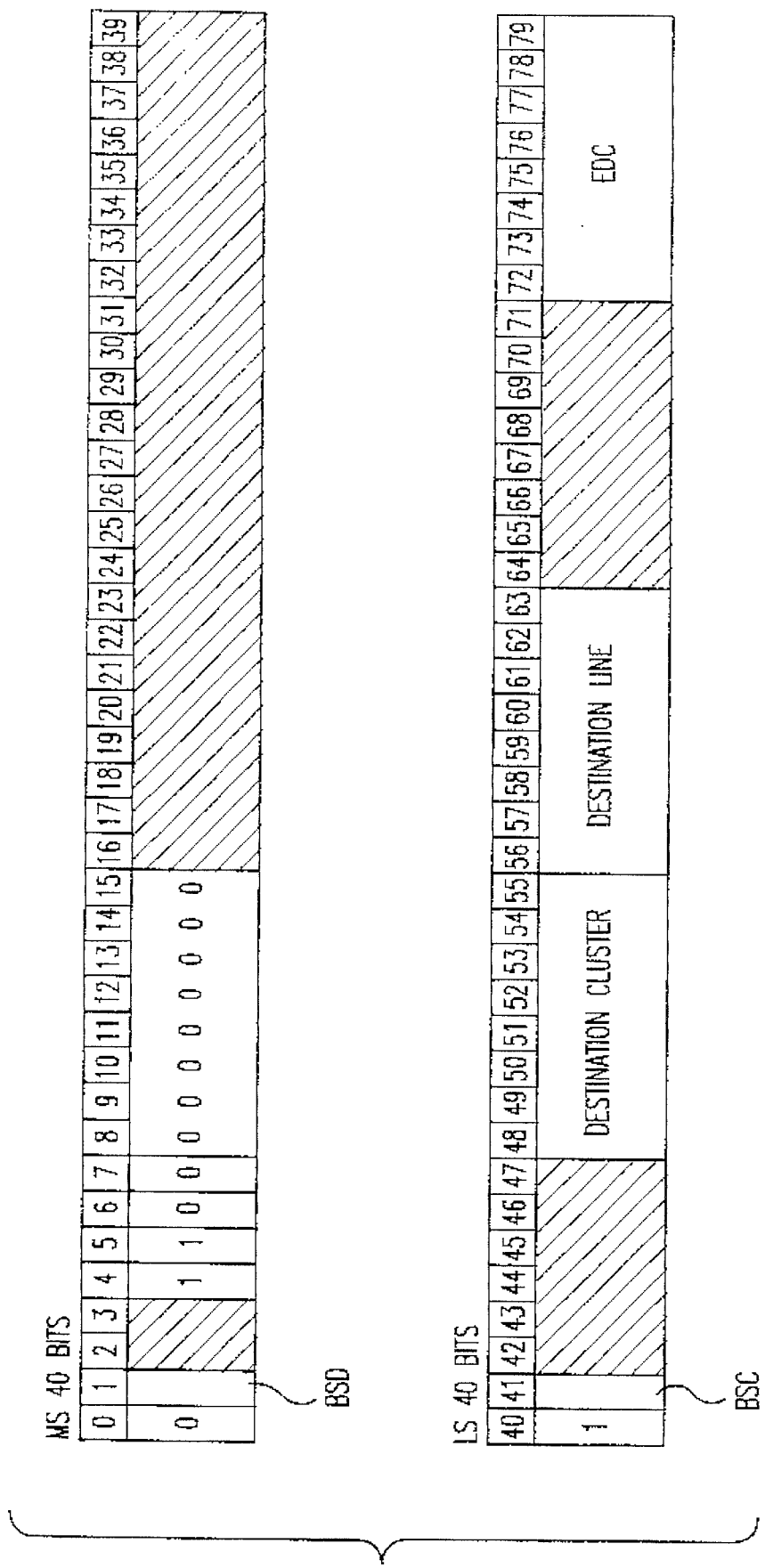
FIG. 16 illustrates the format for an interrupt packet.

The interrupt packet format is shown in FIG. 16.

The Destination Cluster field (bits 48–55) contains the address of the MCS cluster for which the packet is ultimately intended. The FMC in the destination cluster uses the Destination Line field (bits 56–63) to determine which output interrupt line to pulse.

A Motorola 68000 microprocessor on the FMC provides the configuration system interface as well as data management for all transfers other than memory write transfers. This includes all asynchronous data, interrupts and error logging. It also provides diagnostic capabilities driven through the configuration programming interface.

Figure 17:
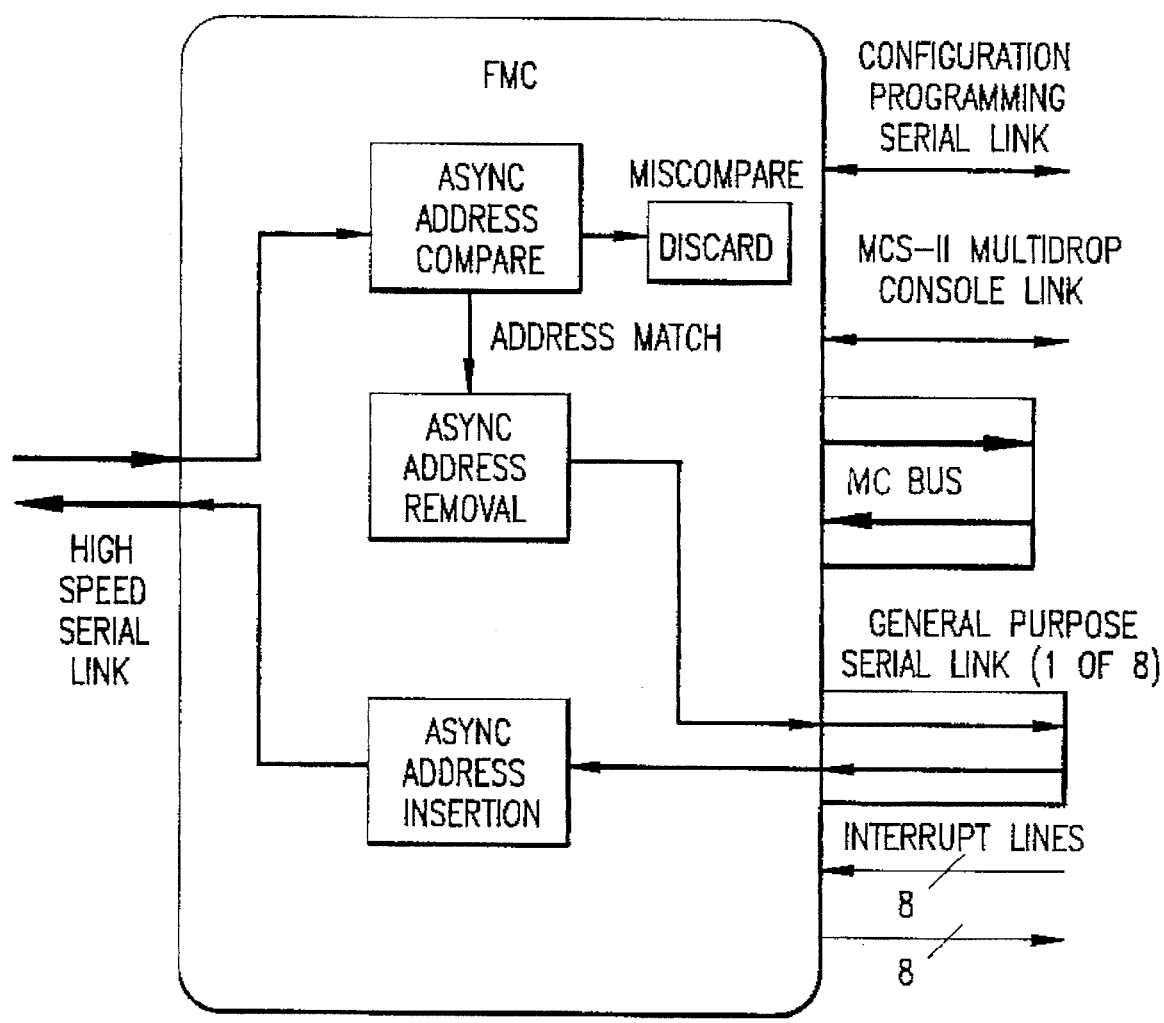
FIG. 17 illustrates the mode of operation of the FMC for the handling of async serial data.

Four Signetics 68681 DUARTs on the FMC provide support for the exchanges of async serial data between the nodes and/or devices in separate MCS clusters. The async support is designed in such a way that communicating entities need not be aware that the async data is actually traveling over a high-speed fiber or connection. From the perspective of the entitles, communication is not functionally different from the case where the nodes and/or devices are directly connected via RS-232 cables. No special protocol information has to be inserted by the communicating entities into the async data stream to allow the data to move through the MCS network. FIG. 17 illustrates the handling of async serial data by a FMC in a cluster.

As async serial data is received from a node or device, the FMC packetizes the data and transmits the packets over the high speed serial link. In addition to async data, each packet contains an address which facilitates routing of the packet through the MCS network. In the other direction, the FMC receives and decodes packets of async data from the high speed link. The address in the packet is discarded and the async data is passed to the node or device.

The address in an async packet is designed to allow routing of the packet through a MCS hub. To accomplish this, the address consists of two fields, a destination cluster field and a destination port field. The destination cluster field indicates the cluster to which the packet is to be routed. The destination port field indicates which async link of the FMC in the destination cluster that the data is intended for. The destination FMC validates the address when it receives the packet. If the destination cluster address does not match the local cluster address, the packet is discarded.

The FMC maintains a list of eight async addresses, one for each general purpose async port. When async data is received from one of the eight ports, the FMC looks up the async address for that port and includes it in the packet(s) sent over the high speed link. Thus, there is a static connection between each general purpose async port of a FMC and an async port of a FMC in some other cluster.

The contents of the list of async addresses and the local cluster address are established during configuration programming of the FMC. The physical characteristics of the async links (i.e., baud rate, character length, etc.) are also established during configuration programming.

Figure 18:
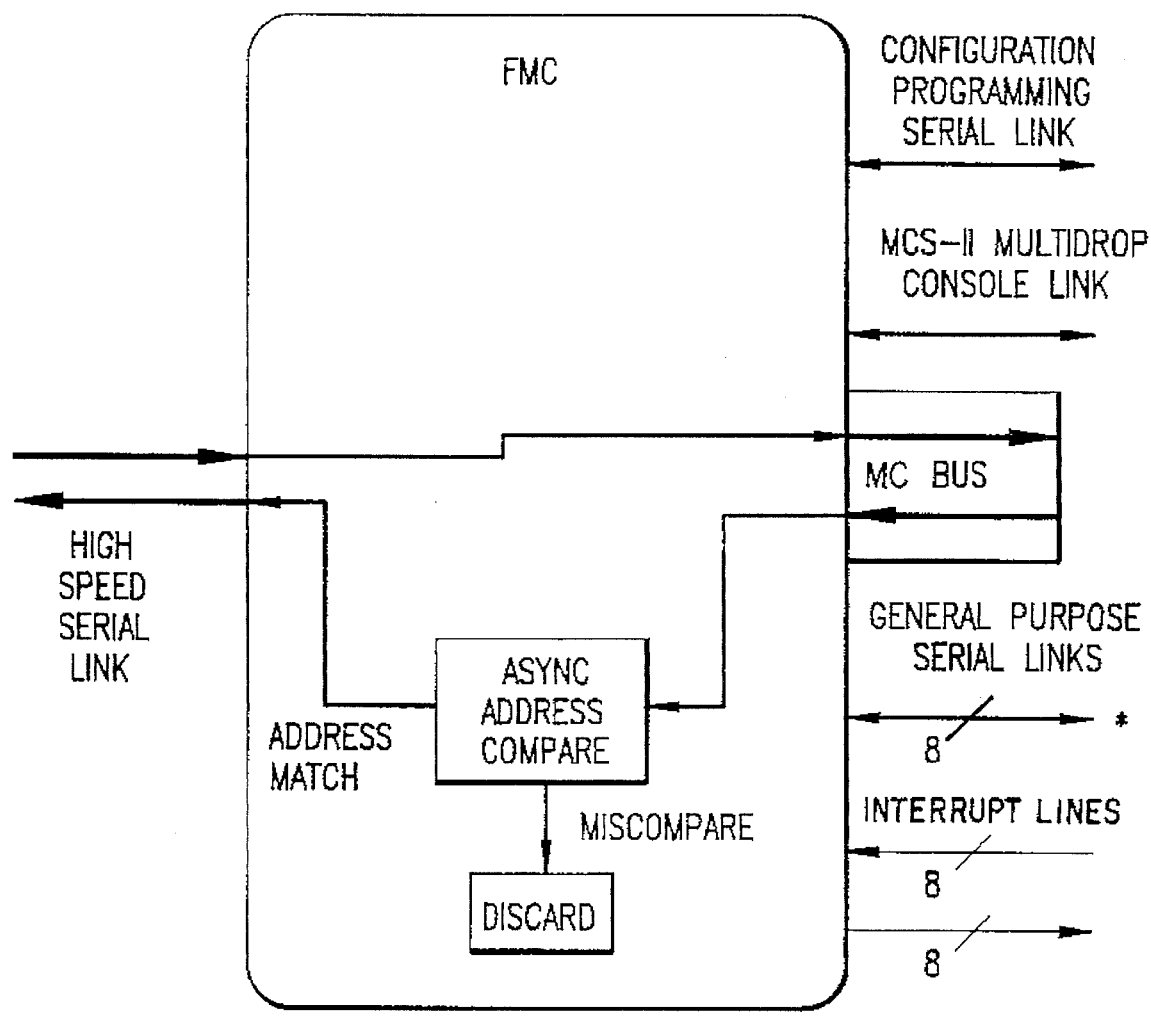

In a MCS hub, the FMCs are programmed to operate in a special async data pass-through mode. This mode of operation is illustrated in FIG. 18. Async packets received over the high speed link are decoded by the receiving FMC and sent over the hub MC bus to the other FMCs in the hub. The address field inserted by the FMC at the originating cluster is passed along over the hub MC bus as well as the async data. Each FMC in the hub which receives the address and async data from the MC bus compares the destination cluster field to the address of the cluster at the remote end of its high speed link. If a match occurs, the FMC builds and transmits an async packet over the high speed data link.

The remote cluster address used by a FMC in the hub to perform the routing function just mentioned is established during configuration programing. Since the async links of a FMC in a hub are not connected and are ignored by the FMC, no async address list or async link physical characteristics can be programmed.

To accommodate the case where the high speed link of a FMC in one hub is directly connected to a FMC in another hub (rather than to a MCS cluster), async address checking may also be disabled in a FMC via configuration programming. Thus, all async packet traffic over the bus of one hub will also appear on the bus of the other hub.

The general purpose async ports of a FMC support hardware flow control using DTR and CTS. When a FMC wishes to transmit over a general purpose async port and hardware flow control is enabled for that port, the FMC only transmits as long as it sees CTS asserted. A loss of CTS during transmission causes the port to cease transmission until CTS reappears. Thus, the device connected to an FMC async port can throttle FMC data transmission for that port by asserting and deasserting CTS.

The FMC can also throttle a device which is sending it data over a general purpose async port assuming that an appropriate cable is used and the device pays attention to the CTS signal. When the FMC determines that its receive buffer for the port is nearly full, it deasserts DTR to inform the device connected to the port of the condition. Assuming a cable which connects the port's DTR signal to the device's CTS signal, the device will see a loss of CTS. This should cause the device to cease transmission until the FMC asserts DTR to indicate that more data can be accepted.

During configuration programming of the FMC, async flow control using DTR and CTS can be enabled or disabled on a per port basis. If DTR/CTS flow control is not desired, FMC general purpose async ports can be configured for XON/XOFF flow control or flow control can be disabled altogether.

To deal with the situation in which a FMC is connected to an async data source which is transmitting data much faster than the device connected to the destination FMC can accept it, an async flow control mechanism is also implemented between FMCs. An FMC can send flow control packets to throttle the transmission of async data packets by the FMC connected to the source of the async data. Flow control can be asserted on a per async port basis so that the flow of async packets for other async ports is unaffected.

The FMC supports 16 interrupt lines: eight input lines and eight output lines. The lines allow an interrupt pulse generated by a node or device in one MCS cluster to be passed, in effect, across the MCS network to a node or device in another cluster. The pulse enters the FMC in the originating cluster via an input interrupt line, is passed across the MCS network as a packet and leaves the FMC in the destination cluster via an output interrupt line. As with async data, this is designed in such a way that the node need not be aware that the interrupt pulse is travelling over a high speed serial link and not actually directly connected.

Figure 19:
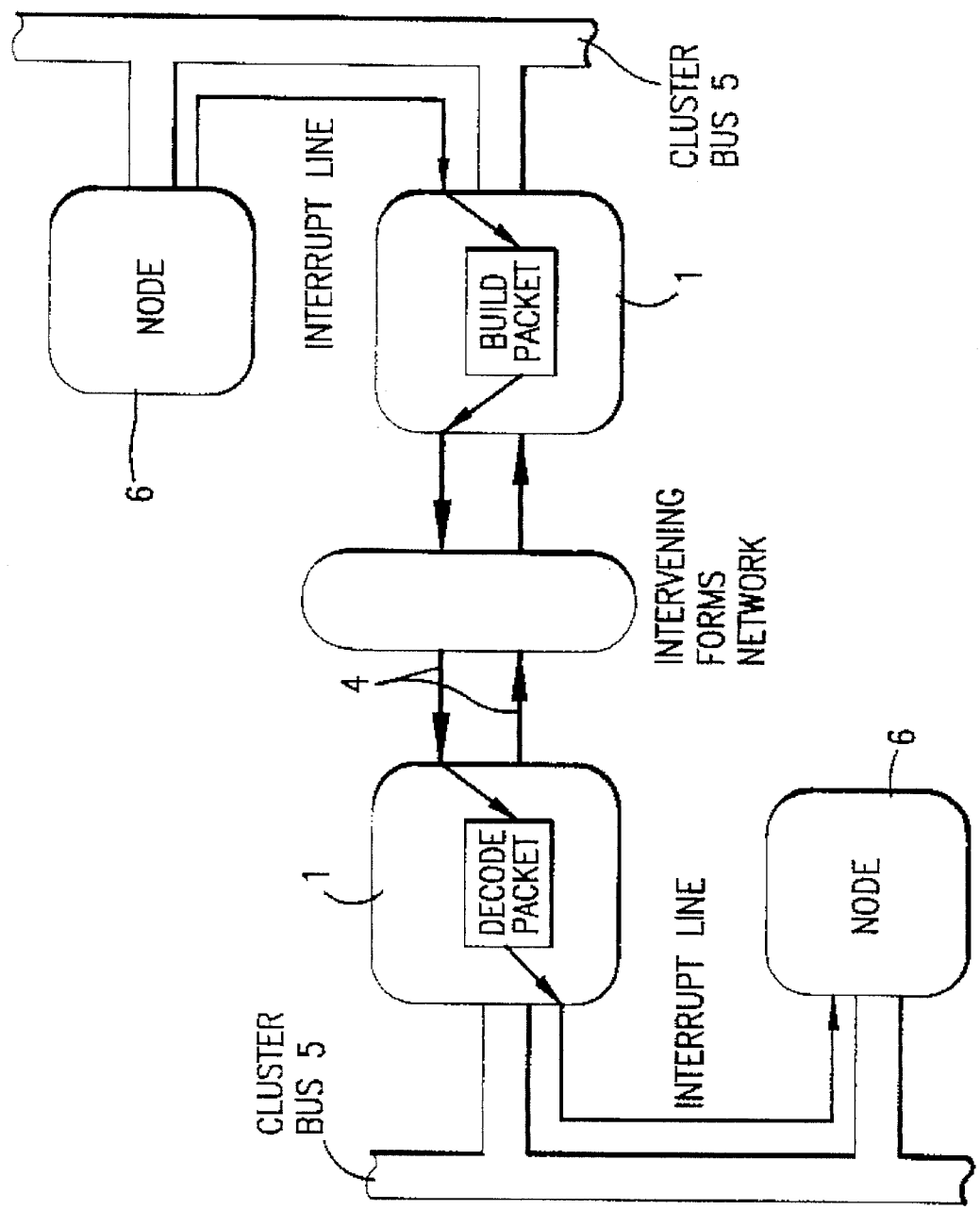
FIG. 19 illustrates handling of interrupts by the FMC.

An overview of interrupt passing for a FOMCS configuration is shown in FIG. 19. The process involved in passing an interrupt across FOMCS is very similar to that used to pass async data. The FMC detects the pulse on the input interrupt line and constructs a special interrupt packet which is transmitted over the high speed link. The interrupt packet contains an address which facilitates routing through the FOMCS network. At the destination FMC, the packet is decoded and the address is used to determine which interrupt line should be pulsed.

As in the async case, the address in an interrupt packet consists of two fields. The destination cluster field identifies the cluster to which the packet is to be routed. The destination line field indicates which output interrupt line is to be pulsed. As with async packets, the destination FMC validates the cluster field of a received interrupt packet and discards the packet if the destination cluster does not match the local cluster address.

The FMC maintains a list of eight interrupt line addresses, one for each input interrupt line. When the FMC detects a pulse on one of the input interrupt lines, it looks up the line address and includes it in the packet sent over the high speed link. Thus, there is a static connection between each input interrupt line of a FMC and an output line of a FMC in some other cluster. The contents of the list of interrupt line addresses are established during configuration programming of the FMC.

In a FOMCS hub, the FMCs are programmed to operate in pass-through mode very similar to that described earlier for async data. Interrupt packets received over high speed link are distributed over the MC bus to the other FMCs in the hub. Each FMC in the hub receives the interrupt line address from the MC bus and compares the cluster field to the address of the cluster at the remote end of its high speed link. If a match occurs, the FMC builds and transmits an interrupt packet over the high speed link.

The remote cluster address used by a FMC in the hub to perform the routing function just mentioned is established during configuration programming. Interrupt address checking can also be: disabled in a FMC to accommodate the situation where hubs are directly connected. Since the interrupt lines of a FMC in a hub are not connected and are ignored by the FMC, no input interrupt address list can be programmed.

Figure 20:
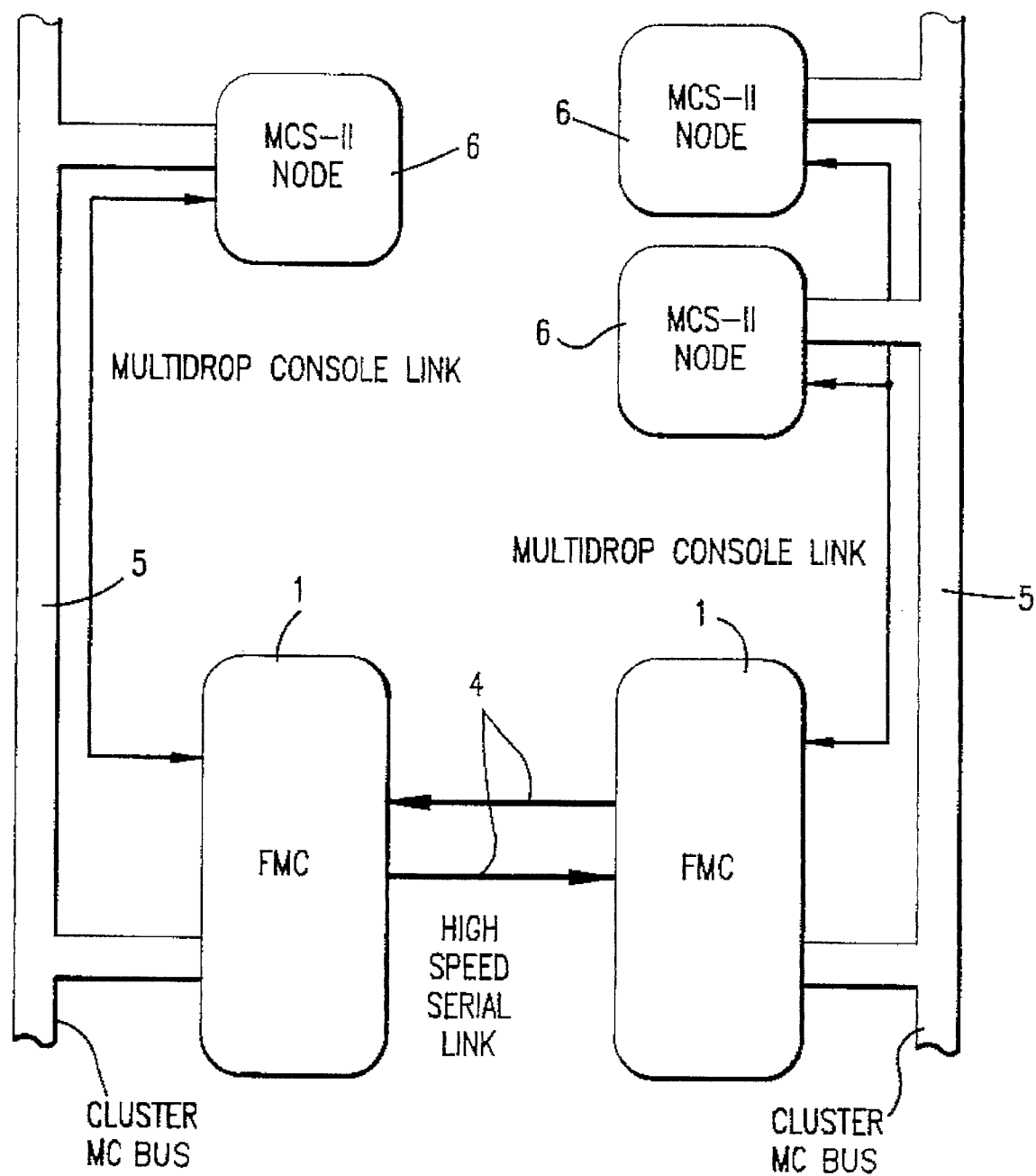
FIG. 20 illustrates an example of network linking clusters of nodes.

One channel of a Signetics 68681 DUART on the FMC is used to provide support for the MCS-II multidrop console link. (The other channel of this DUART is used for the configuration programming link.) The FMC behaves basically as a gateway to allow console traffic to flow between nodes in separate MCS-II clusters. In each cluster, the FMC intercepts messages intended for remote nodes and transmits them as packets to the FMCs in the appropriate clusters. The FMCs receiving the packets decode them and send the messages to the destination nodes. The fact that this is happening is essentially transparent to the nodes. An example of a FOMCS network linking clusters of MCS-II nodes appears in FIG. 20.

In the MCS-II multidrop console environment, one of the drops acts as the master and all others are slaves. Only the master can initiate message exchanges on the multidrop link; a slave can only transmit after receiving a poll message from the master. The FMC in a cluster assumes that there is a local master in the cluster. When the FMC receives a message addressed to a remote node, it transmits the message as one or more packets over its high speed serial link; when the FMC receives one or more packets from the high speed link containing a message from a remote node, it buffers the message until it is polled by the master. Then, the FMC transmits the saved message over the local multidrop link. Note that a cluster FMC's slave address on the multidrop link is its MC bus node id.

The handling of multidrop message data in the FOMCS network is basically the same as that for general purpose async data and interrupts. Multidrop data is routed through the FOMCS network in special packets. Each multidrop data packet contains a destination cluster address (which is validated by the destination FMC) and part of a message. Unlike interrupt packets or packets of general purpose async data, multidrop message packets also contain a source cluster address. The receiving FMC uses the source address to segregate pieces of messages from different clusters into different buffers.

The source cluster address which a node inserts into a message is supplied by the FMC in the cluster. The multidrop master periodically sends a request-cluster-address message to the FMC which causes it to broadcast a response message containing the cluster address to all nodes in the cluster. This cluster address is the address established during configuration programming via the Define Cluster Address command. Note that in a MCS-II cluster where there is no FMC to supply the source cluster address, communication between nodes is unaffected because the source cluster address field is not included in messages exchanged by nodes in the same cluster.

In FOMCS configurations where a hub is present, multidrop data is routed from the receiving FMC to the other FMCs in the hub via the hub MC bus. Packets are then built and transmitted from FMCs in the hub to the FMCs in the destination clusters. As with general purpose async and interrupts, a FMC in the hub looks at the destination cluster address to determine if it should build and transmit a packet over its high speed link. If the destination cluster matches the address of the cluster connected to the FMC's serial data link, the FMC forwards the multidrop data.

The MCS-II multidrop broadcast capability is also supported by FOMCS. When the FMC in a cluster receives a message over the local multidrop link that is to be broadcast to all nodes, it sends the message across its high speed link in packets which have a broadcast flag set. FMCs in a hub will always forward such packets regardless of the contents of the destination cluster field. All cluster FMCs receiving the broadcast message will transmit it over their local multidrop links when polled by the local masters.

During configuration programming, a cluster FMC is programmed with a list of remote cluster addresses. When multidrop support is enabled, the FMC intercepts any message on the multidrop link which is addressed to a node in one of the clusters in the list. The local multidrop master can obtain the list from the FMC by sending it an inquiry message. The FMC responds by encoding the list into a remote-cluster-list message which it sends over the multidrop link.

Figure 21:
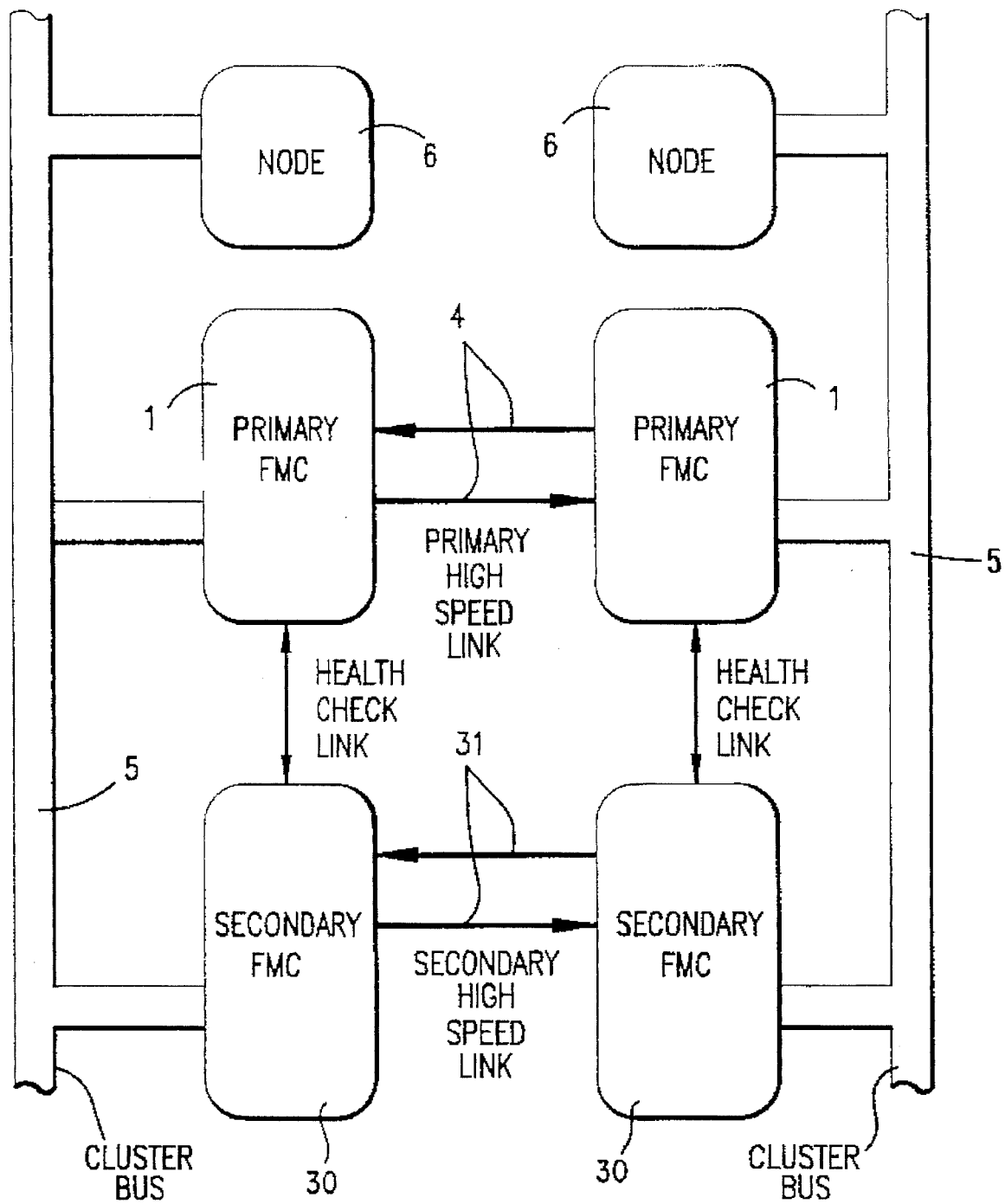
FIG. 21 illustrates a secondary backup high speed link for the system.

The FMC supports an optional configuration which allows automatic failover to a secondary high speed serial link should the primary link go down. This high availability feature is illustrated in FIG. 21.

The secondary FMCs in each cluster monitor the health of the primary FMCs. Each secondary FMC is configured for the same MC bus node id as the primary it monitors but the secondaries do not interact on the MC bus as long as the primaries are healthy. In other words, all memory write traffic between the clusters goes over the primary high speed link until a failure occurs. Likewise, all other types of packet traffic (i.e., async, interrupt, etc.) go over the primary link until a failure is detected.

To keep the secondary FMCs informed as to their health, the primaries periodically send their respective secondaries an "I'm okay" indication via a health-check link. The UART of a Motorola 68901 MFP on the FMC is used to implement the health-check link. The primaries also periodically exchange test packets to determine if the primary link is still functioning.

If a secondary FMC does not receive an "I'm okay" indication within a specified time period since the last indication or if the secondary receives a link failure indication from the primary, the secondary initiates the fail-over process by: 1) forcing the primary FMC to cease operation, and 2) sending a failure-detected packet to the secondary in the remote cluster. The remote secondary FMC then forces its primary FMC to cease operation. The remote secondary then sends a fail-over-complete packet back to the secondary which detected the failure. Subsequent communication between the clusters occurs over the secondary high speed link.

A secondary FMC forces a primary to cease operation by asserting a special additional signal which is included in the health-check link cable connecting the primary and secondary. When asserted this signal places the primary FMC into a hardware-controlled offline state. In this state, all I/O interfaces on the FMC are disabled so that the FMC is unable to assert any signals on the MC bus, transmit over the high speed link, transmit over any of its async links or pulse any of its output interrupt lines. The effect is identical to that achieved by putting the FMC online/offline switch into the offline position.

The (old) primary FMC is held in this offline state until the secondary FMC (which is the new primary) is reset via a power cycle, hardware reset or a received Reset command.

While the old primary FMC is being held in this offline state, it monitors the health-check link (if it is operational enough to do so) for the receipt of "I'm okay" characters from the new primary. If the old primary receives such characters, it reconfigures itself to assume the secondary role. Thus, when an attempt is made to return the old primary FMC to an online state, it behaves as a secondary and remains in a (firmware-controlled) offline state. This prevents the old primary from contending with the new primary on the MC bus.

The fail-over process can also be initiated manually via the configuration programming link. To cause a fail-over, a command is sent over the programming link to one of the secondary FMCs. The fail-over proceeds as described above and when it complete, a response indicating such is returned via the programming link.

While the previous discussion relates to high availability of the high speed link between clusters, the high availability feature can be extended to the hub in a FOMCS star network. High availability in a hub is achieved by having a secondary FMC for each primary FMC in the hub. Thus, each cluster is connected to the hub by two high speed links, a primary and a secondary. Fail-over to a secondary link is essentially the same as the cluster to cluster case.

Note that to really achieve high availability in a cluster, nodes which have async or interrupt connections to the primary FMC must have a redundant set of connections to the secondary. When the secondary FMC takes over, the nodes must switch over to the secondary async and interrupt connections. To facilitate this process, one of the output interrupt lines of a secondary FMC can be used to inform the node(s) that fail-over has occurred. During configuration programming of a secondary FMC, an output interrupt line can be designated for this purpose.

The fail-over process is not automatically reversible. Once the secondary FMCs have taken over, they become in effect the primaries. When the previous primary FMCs and/or high speed link are repaired, they must be programmed to behave as the secondaries (if they have no already reconfigured themselves as secondaries).

Configuration of a FMC as a primary or secondary occurs during configuration programming. The maximum time period that a secondary will allow between "I'm okay" indications from the primary is also established. The high availability feature can also be disabled altogether.

Another usage of the microprocessor is to allow diagnosis of an individual FMC and/or high speed serial link without bringing the entire MCS network offline. This capability is particularly useful in the star network environment where it is undesirable to shut down the entire hub just to diagnose a problem between the hub and a particular cluster. If the problem turns out to be the high speed link or the FMC in the cluster, it can be corrected without taking down the entire hub. Of course, software resynchronization will probably be necessary between the affected cluster and the other clusters it was communicating with but the rest of the clusters connected to the hub can continue to communicate without interruption.

Special operational modes, referred to as hub diagnostic and cluster diagnostic modes, are available to allow the FMC to be isolated from the high speed coax or fiber link for testing purposes. In these modes, the FMC operation is identical to normal hub or cluster mode except that the output of the Gazelle Hot Rod Tx chip is directly connected to the input of the Rx chip. To configure the FMC to operate in hub of cluster diagnostic mode, the Set FMC Online/Offline command used to place the FMC in a firmware-controlled offline state. Then, the desired mode is selected via the Set Operational Mode command and the FMC is returned to an online state by means of a second Set FMC Online/Offline command.

Individual functional areas of the FMC can be tested by sending Specify Diagnostic Loopback Data commands to the FMC. Variations of the Specify Diagnostic Loopback Data command can be used to invoke memory write transfer loopback, async data loopback and interrupt loopback. A FMC will only accept such commands when in the firmware-controlled offline state.

Figure 22:
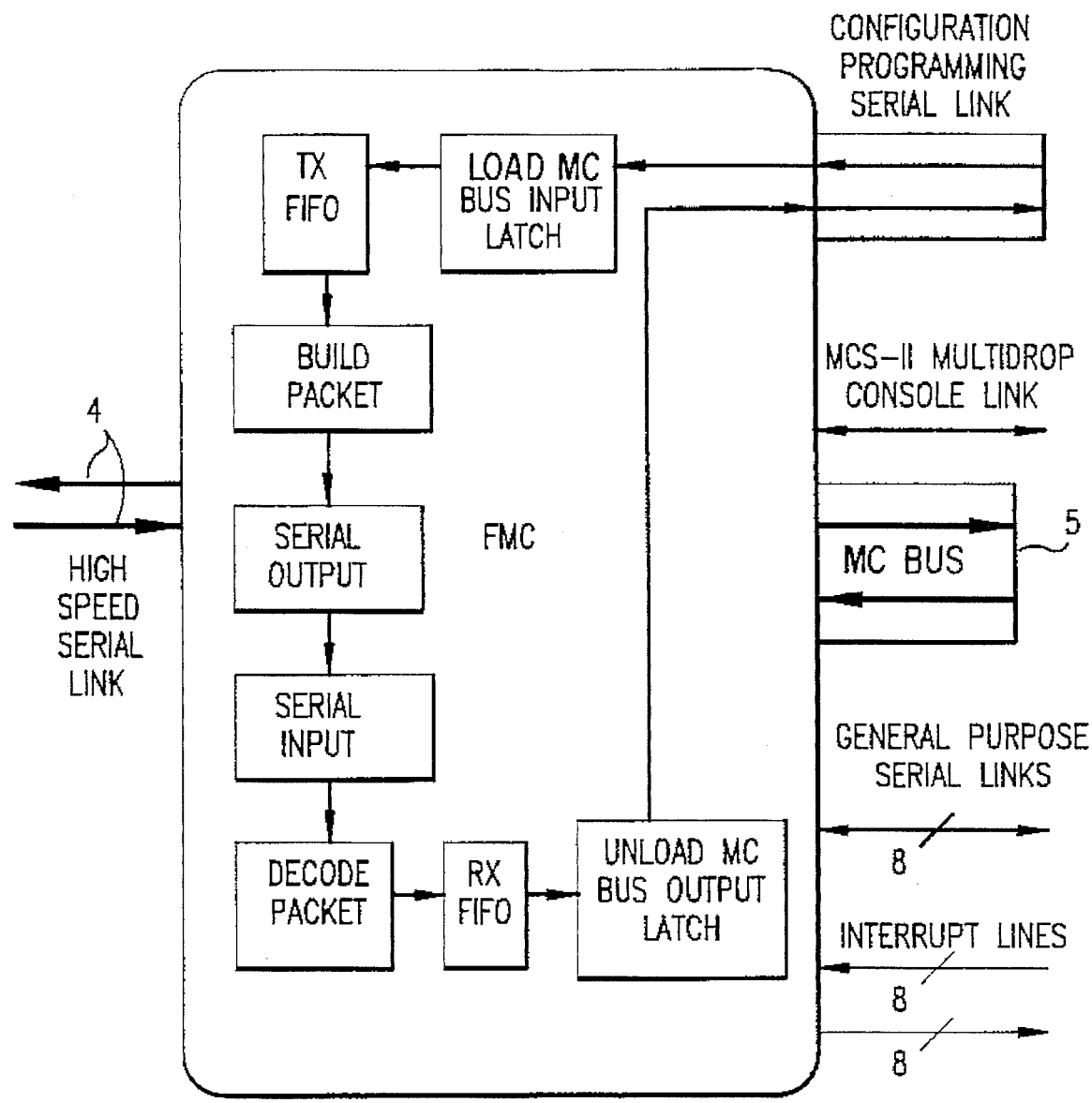
FIG. 22 illustrates internal loopback for memory write transfers.
Figure 23:
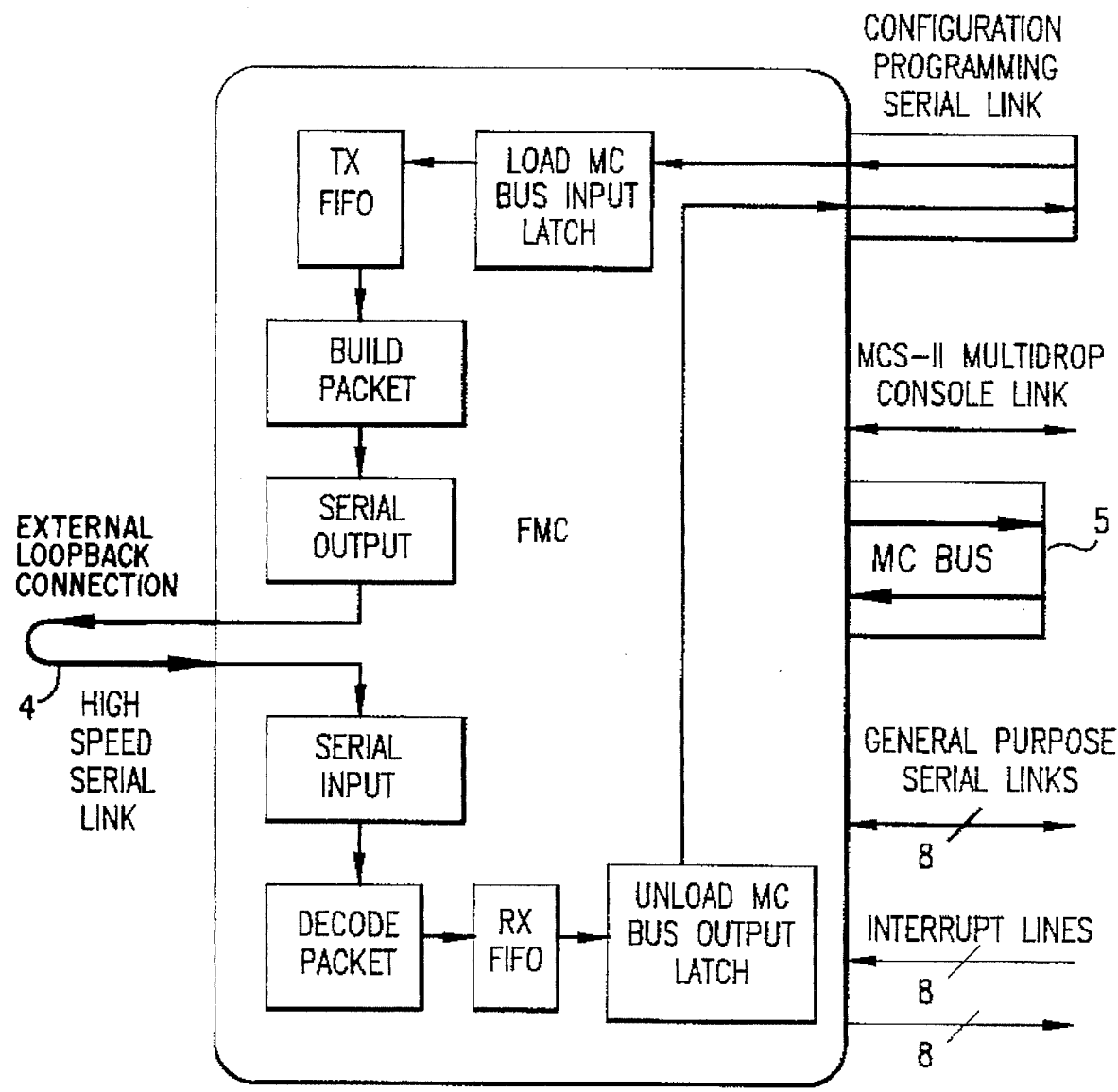
FIG. 23 illustrates external loopback for memory write transfers.
Figure 24:
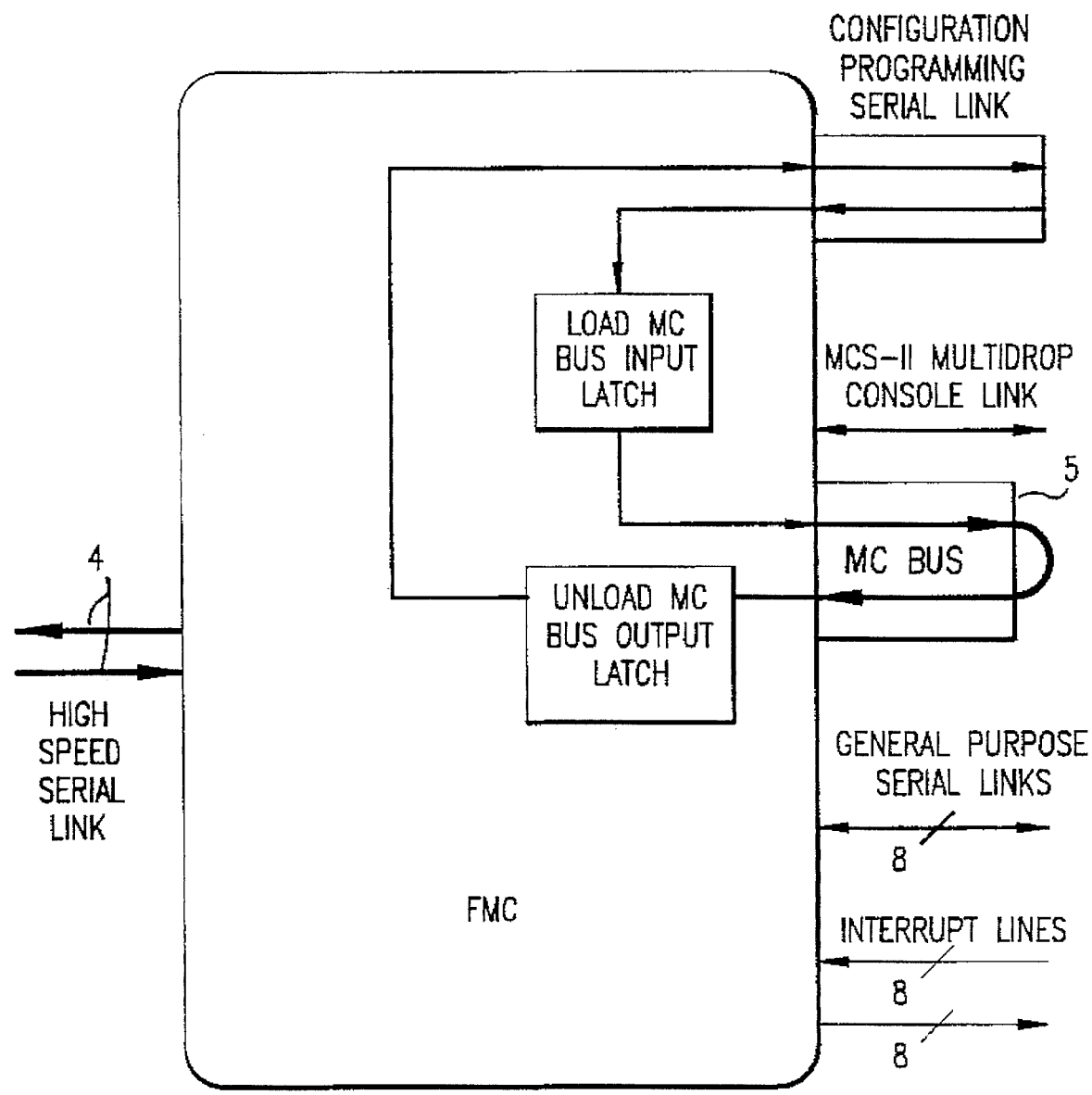
FIG. 24 illustrates memory coupling bus loopback.

The FMC supports three diagnostic loopback modes for memory write transfers: internal, external and MC bus loopback. Internal loopback loops data through the FMC from the MC bus input latch to the MC bus output latch. External loopback tests the same path except that the data is actually transmitted over the high speed serial link and looped back via an external loopback cable connection. Internal loopback mode is shown in FIG. 22. External loopback mode is shown in FIG. 23. MC bus loopback loops data from the MC bus output latch to the MC bus input latch via the MC bus. This loopback mode is illustrated in FIG. 24.

Note that when internal or external loopback is performed, the FMC hit/translation RAM must also be programmed appropriately to achieve the desired effect. Loopback modes can be used to specifically test reflection region or address translation logic or the hit/translation RAM can be programmed such that all regions are reflected and address translation does not actually do anything (i.e., the original address and the translated address are the same).

In internal loopback mode, the MC bus interface of the FMC is disabled and the Gazelle Hot Rod chips are configured such that the serial output of the transmitter chip is connected directly to the serial input of the receiver chip. The Specify Diagnostic Loopback Data command which initiated the loopback also contains an address and data pattern to be looped through the FMC hardware. The FMC inserts the address and data pattern into the MC bus input latch. The address and data proceed through the Tx path and at the end of the Tx path are transmitted serially in a packet. The Packet is looped back through the Rx path and the address and data end up in the MC bus output latch. The FMC removes the address and data from the latch and includes them in the response sent back via the programming link.

In external loopback mode, the MC bus interface of the FMC is disabled. Again, the Specify Diagnostic Loopback Data command which initiated the loopback contains an address and data pattern to be looped through the FMC hardware and the external loopback connection. The FMC inserts the address and data pattern into the MC bus input latch. The address and data proceed through the Tx path and at the end of the Tx path are transmitted serially in a packet. The packet is looped through the external loopback connection, received again by the FMC and moves through the Rx path to the MC bus output latch. A response is sent back via the programming link containing the address and data pattern read from the latch.

In MC bus loopback mode, the high speed serial link interface is disabled and the MC bus interface of the FMC is enabled but functions somewhat differently from normal. To perform the MC bus loopback, the FMC inserts the address and data pattern from the Specify Diagnostic Loopback Data command into the MC bus output latch. The FMC MC bus interface hardware then requests the bus and when it receives a grant, generates a transfer on the MC bus with the data valid signal deasserted. This causes any nodes on the bus to ignore the transfer. The FMC MC bus interface hardware, however, is configured to receive its own transfer. The looped data is read from the MC bus input latch and returned in the response sent back via the programming link.

Figure 25A:
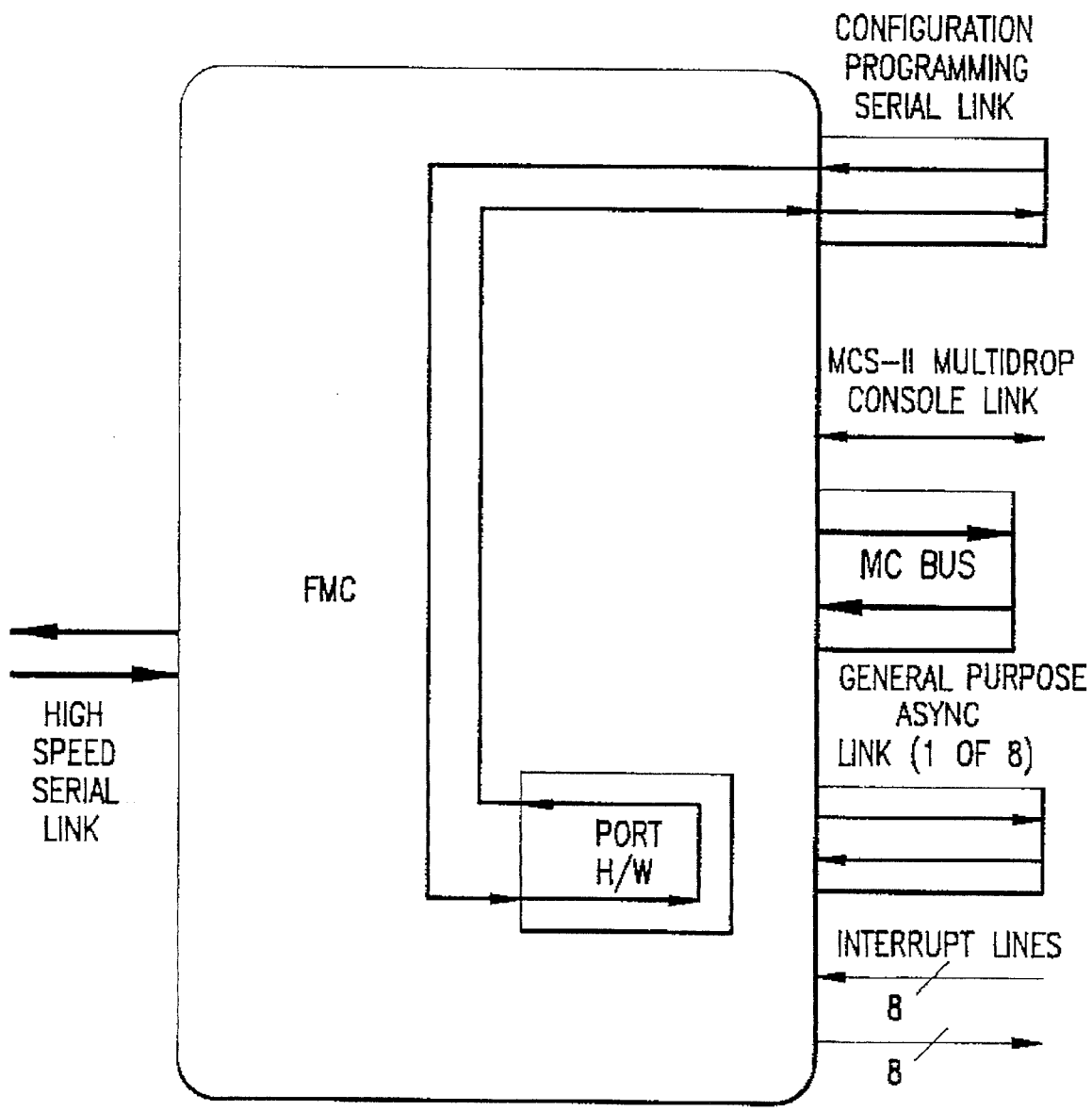
FIG. 25a illustrates internal loopback for general purpose async data.
Figure 25B:
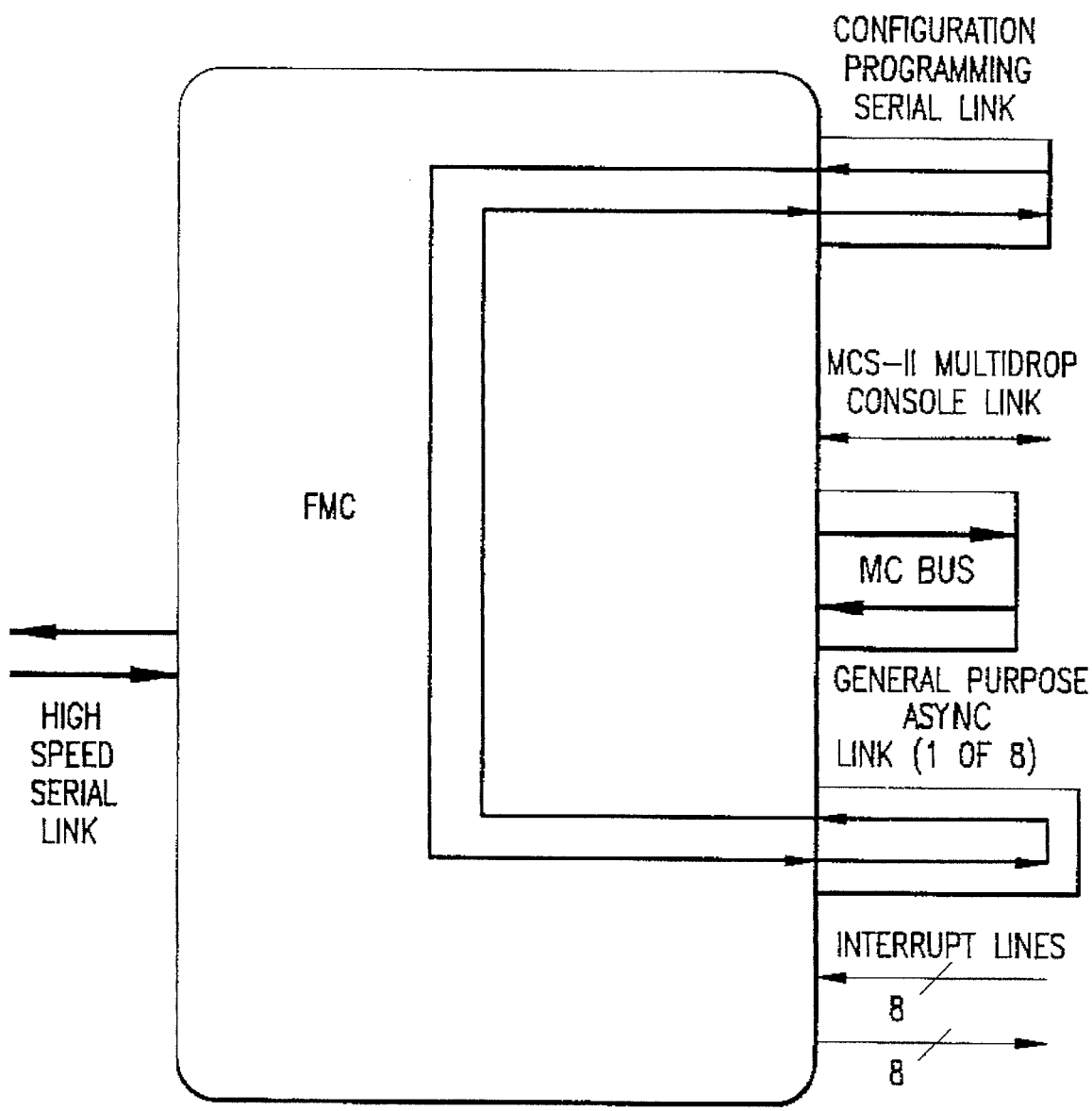
FIG. 25b illustrates external loopback for general purpose async data.
Figure 25C:
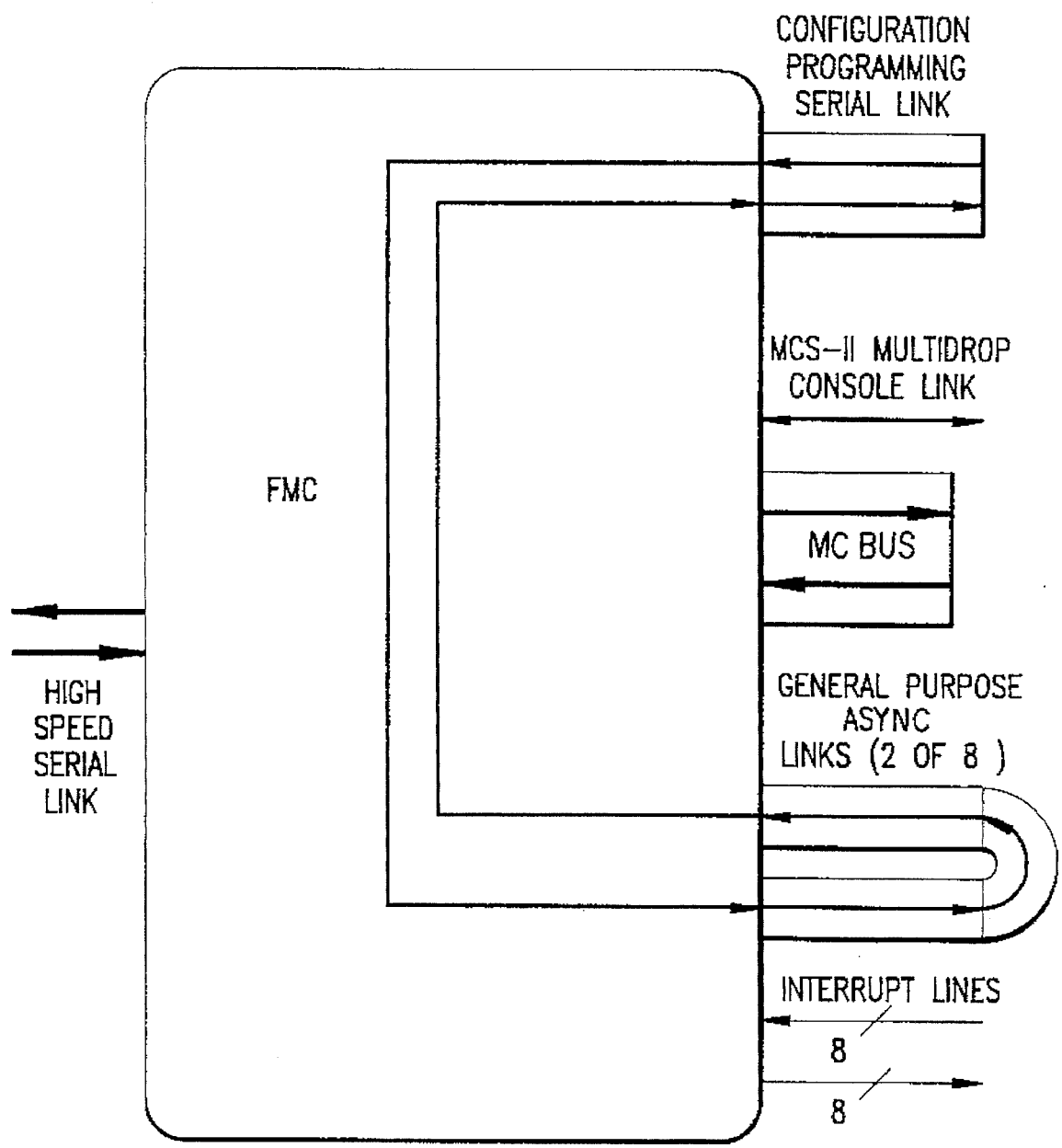
FIG. 25c illustrates port-port loopback.

The FMC supports three diagnostic loopback modes for general purpose async data: internal, external, and port-port. The three varieties are illustrated in FIG. 25. The FMC performs the requested async loopback as the result of a Specify Diagnostic Loopback Data command received over the configuration programming link.

The Specify Diagnostic Loopback Data command informs the FMC as to which async port(s) will participate in the loopback test and provides the data to be looped. If an async port is selected for internal loopback, the FMC initializes the port hardware to wrap transmitted data back to the receive side of the port. The FMC then causes the port to transmit the data. If the port is functioning correctly, the FMC immediately receives the data back again. The received data is passed back over the programming link in the command response. If no data is received, the FMC returns a response indicating such.

External loopback requires that a loopback plug be connected to the port which wraps transmitted data back to the receive pin of the port. The FMC initializes the port hardware for normal operation and transmits the data via the specified port. Again, the data should be immediately received from the same port. The response to the command contains the received data or indicates failure of the loopback operation.

Port-port loopback requires that a RS-232 cable connect the two selected ports. The FMC initializes the ports for normal operation and transmits the data via the port specified in the Specify Diagnostic Loopback Data command. The response to the command Contains the data received from the other port or indicates failure of the loopback operation.

The FMC supports external loopback for the interrupt lines. A Specify Diagnostic Loopback Data command to the FMC selects a pair of interrupt lines that will participate in the loopback, one input and one output. Note that loopback requires that a wire connect the selected interrupt lines. To perform the loopback, the FMC generates a pulse on the output line of the pair and reports in its command response whether or not a pulse was detected on the input line.

The FMC supports two diagnostic loopback modes for the MCS-II multidrop console link: internal and external. Internal loopback is performed exactly as with the general purpose async ports. External loopback is functionally identical to the method used with the general purpose async ports, but because of the unique nature of the multidrop link, no external loopback cable is required. However, the external loopback test will drive the multidrop link. Therefore, if testing is desired without bringing the entire multidrop link offline, the MCS cable which carries the multidrop link should be unplugged from the FMC chassis backplane prior to initiating diagnostic tests and replaced when testing is concluded.

The FMC supports two diagnostic loopback modes for the high availability health-check link: internal and external. Both modes are performed in the same manner as with the general purpose async ports.

Each packet transferred across the high speed serial link in a FOMCS configuration contains an error detection code (EDC) which allows the receiving FMC to determine if an error occurred during transmission. Packets received with good EDC are also checked for illegal or illogical bit settings. Parity is checked for transfers received across the MC bus and transfers received with good parity are also checked for illegal or illogical bit settings.

For packet errors and transfer errors detected by the receiving FMC, the FOMCS philosophy is to report the error to the node(s) in the nearest cluster rather than reporting the error to all nodes in the network. No attempt is made to handle errors in memory write transfer packets differently from errors detected in other types of packets because once an error is detected in a packet, the entire contents of the packet are suspect including the packet type field.

Figure 26:
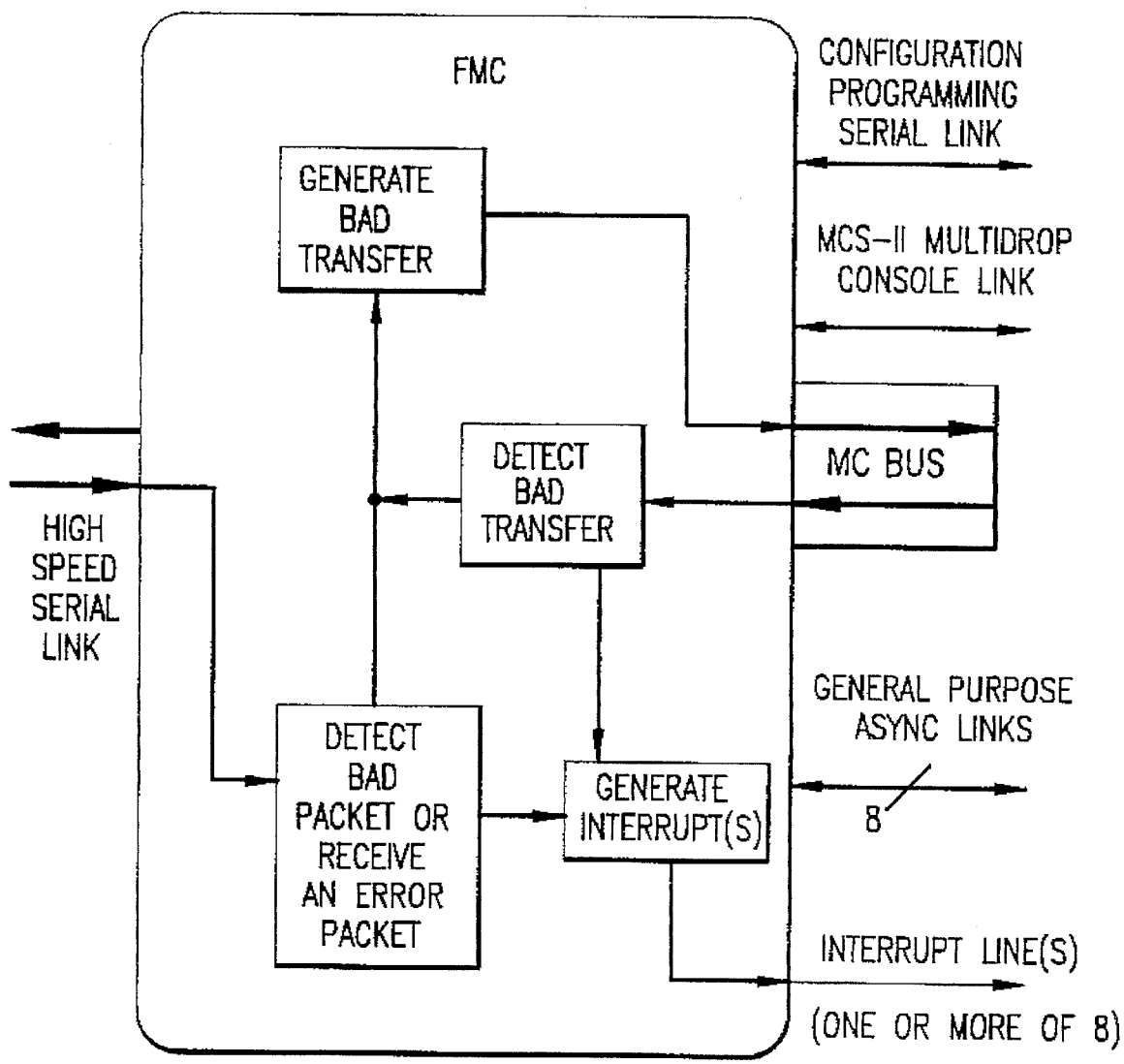
FIG. 26 illustrates cluster FMC error handling.
Figure 27:
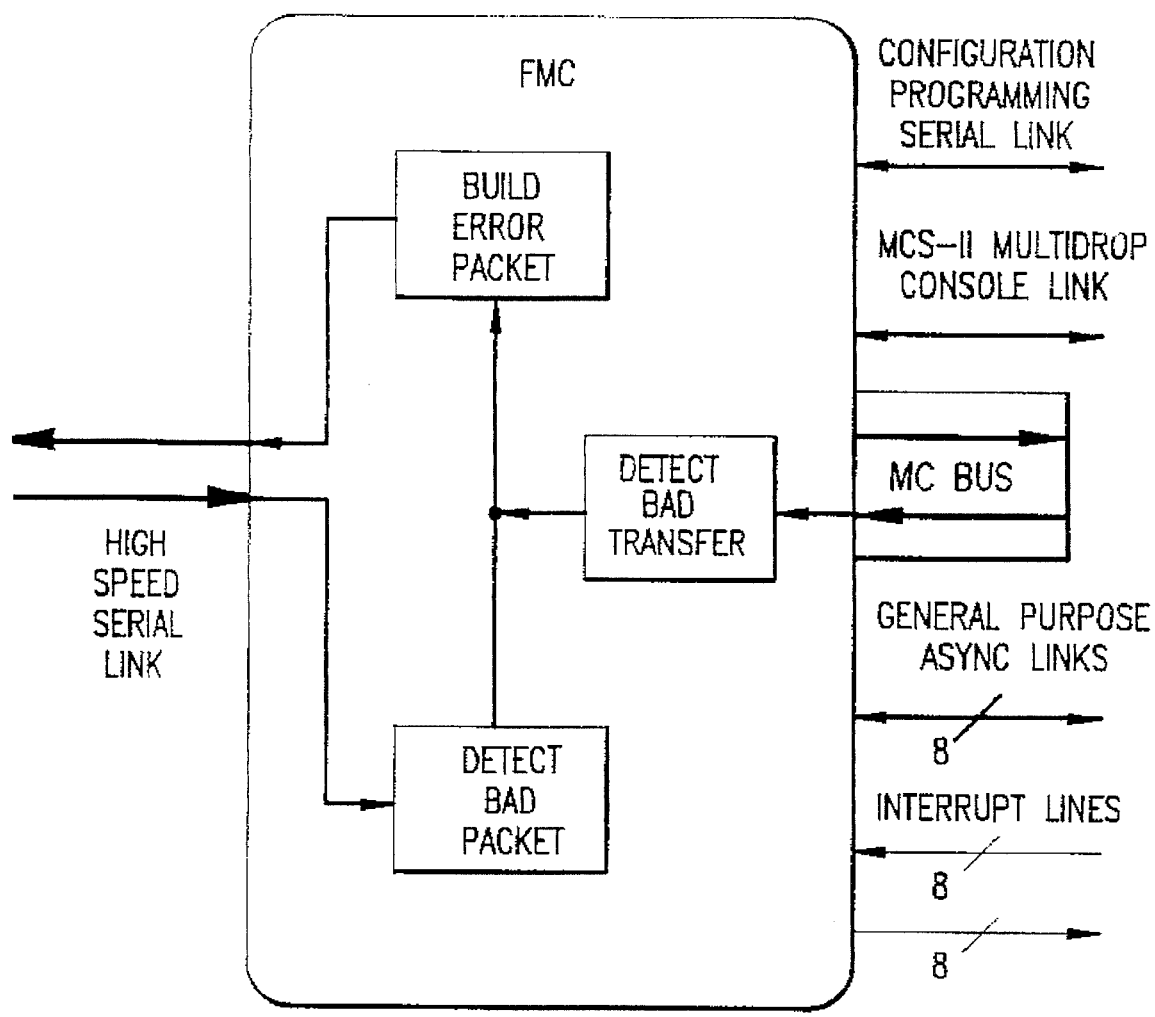
FIG. 27 illustrates hub FMC error handling.

The method of reporting errors is illustrated in FIGS. 26 and 27. When a FMC in a cluster detects an error in a packet received over the high speed link or detects an error in a MC bus transfer, it reports the error to the node(s) in the cluster by: 1) forcing a parity error on the MC bus and/or 2) directly interrupting the node(s). To force a parity error, the FMC arbitrates for the MC bus and when granted access, generates a transfer where the parity driven on the bus does not match the address and data. This causes the MC port of the each node to detect a transfer with bad parity and (hopefully) report it to the node via a parity error interrupt. The direct interrupt approach utilizes one or more of the FMC's eight output interrupt lines.

When a FMC in a hub detects an error in a transfer received over the hub MC bus or detects an error in a packet received over its high speed link, it builds an error packet and transmits it to the FMC at the other end of the high speed link. Receipt of the error packet causes the FMC in the cluster to report the error as described earlier. Note that whether or not the FMC in the cluster receives the packet correctly, an error will be reported.

To assist with diagnosis of packet transmission or MC bus transfer errors, the FMC keeps a copy of the last bad packet (if any) and the last bad MC bus transfer (if any) that it received. These copies can be accessed at any time via the configuration programming link.

During configuration programming, the error reporting behavior of a FMC in a cluster is established. The FMC can be programmed to report errors by generating MC bus parity errors and/or by generating interrupts. If the interrupt approach is selected, one or more output interrupt lines of the FMC can be programmed as outputs for error signals. Each of the selected lines can be further qualified as to when the line is pulsed: 1) when a bad MC bus transfer is detected (or when an error packet is received indicating that the remote FMC detected a bad transfer), 2) when a bad packet is received over the high speed link (or when an error packet is received indicating that the remote FMC detected a bad packet), or 3) when either a bad transfer or a bad packet is detected.

Although the present invention has been shown and described with reference to preferred embodiments, changes and modifications are possible to those skilled in the art which do not depart from the spirit and contemplation of the inventive concepts taught herein. Such are deemed to fall within the purview of the invention as claimed.

We claim:

1. A system comprising:

a first and second set of plurality of nodes;

a first bus associated with and connecting said first set of plurality nodes;

a second bus associated with and connecting said second set of plurality of nodes;

each node except one of each of said first and second sets of plurality of nodes including a processing unit, a memory, a bus coupled to the processing unit and memory, and a sensor means for sensing a write from the processing unit to the memory and for transmitting the sensed write including data and an address to which said data is being written on said associated bus without intervention of the processing unit;

fiber optic means for optically transmitting data and associated addresses from one excepted node to the other excepted node;

the excepted node of the first set of plurality of nodes including first converter means connected to the first bus for (1) receiving data and associated addresses on said first bus in a parallel fashion, (2) converting said data to corresponding optical signals, (3) transmitting said optical signals via said fiber optic means, (4) receiving optical signals from said fiber optic means in a serial fashion, and (5) transmitting the optical signals received from said fiber optic means onto said first bus, said first converter means including latches receiving and outputting data from said first bus or said fiber optic means in a parallel fashion and receiving and outputting diagnostic data in a serial fashion;

the excepted node of the second set of plurality of nodes including second converter means connected to the second bus for (1) receiving data and associated addresses on said second bus in a parallel fashion, (2) converting said data to corresponding optical signals, (3) transmitting said optical signals via said fiber optic means, (4) receiving optical signals from said fiber optic means in a serial fashion, and (5) transmitting the optical signals received from said fiber optic means onto said second bus, said second converter means including latches receiving and outputting data from said second bus or said fiber optic means in a parallel fashion and receiving and outputting diagnostic data in a serial fashion; and both said first and second converter means including selection means for accepting for transmission only data having preselected associated addresses.

2. The system of claim 1 wherein each said converter means includes a FIFO for temporarily storing data.

3. The system of claim 1 wherein all nodes but the excepted on further each includes I/O means for introducing I/O data with associated addresses into memory and wherein said sensor means responsive to a write to memory of I/O data with associated addresses transmits same on said associated bus.

4. A system as claimed in claim 1, wherein data is transmitted through the optical fiber means in 80 bit data frames.

5. A system for connecting memory coupled systems, comprising:

a plurality of nodes;

a first data bus connecting a first group of said plurality of nodes;

a second data bus connecting a second group of said plurality of nodes;

one of said plurality of nodes of the first group including first converter means for converting signals on the first data bus to optical signals and for transmitting same;

one of said plurality of nodes of the second group including second converter means for converting signals on the second data bus to optical signals and for transmitting same;

first fiber optic means for carrying transmitted data from the first converter means to the second converter means;

second fiber optic means for carrying transmitted data from the second converter means to the first converter means;

the first and second converter means each comprising:

input latch means for receiving data from a respective data bus and having inputs and outputs accessible both in a parallel fashion and a serial fashion;

hit and translation RAM means connected to the input latch means for determining the destination of data received from the data bus;

first micro-interface means connected to the input latch means for controlling the hit and translation RAM means;

transmission FIFO means connected to the input latch means for latching the data received from the data bus;

error detection means for determining if an error exists in the data in the transmission FIFO means;

first and second transmission latches connected to the transmission FIFO means, each of said transmission latches having inputs and outputs accessible both in a parallel fashion and in a serial fashion;

transmitter means connected to the first and second transmission latches for transmitting the data to another converter means;

receiver means for receiving data transmitted from another converter means;

first and second receiver latches for latching the received data, each of said receiver latches having inputs and outputs accessible both in a parallel fashion and in a serial fashion;

error detection means connected to the first and second latch means for checking if an error exists in the received data;

second micro-interface means for testing the received data if the check by the error detection means fails;

receive FIFO means connected to the first and second receive latch means for holding the received data after checking by the error detection means;

output latch means for transmitting the received data to the respective data bus and having inputs and outputs accessible both in a serial fashion and in a parallel fashion.

6. A system as claimed in claim 5, further comprising first and second backup converter means for transmitting data between memory coupled systems upon a determination the first and second converter means are not working properly.

* * * * *